US012154352B2

(12) United States Patent
Cai et al.

(10) Patent No.: US 12,154,352 B2
(45) Date of Patent: Nov. 26, 2024

(54) LANE LINE DETECTION METHOD AND RELATED DEVICE

(71) Applicant: HUAWEI TECHNOLOGIES CO., LTD., Guangdong (CN)

(72) Inventors: Xinyue Cai, Shanghai (CN); Hang Xu, Hong Kong (CN); Wei Zhang, London (GB); Zhen Yang, Shanghai (CN); Zhenguo Li, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 18/064,016

(22) Filed: Dec. 9, 2022

(65) Prior Publication Data

US 2023/0144209 A1 May 11, 2023

Related U.S. Application Data

(63) Continuation of application No. PCT/CN2021/092070, filed on May 7, 2021.

(30) Foreign Application Priority Data

Jun. 12, 2020 (CN) .......................... 202010538270.3

(51) Int. Cl.
| | |
|---|---|
| *G06V 20/56* | (2022.01) |
| *G06T 5/20* | (2006.01) |
| *G06T 7/11* | (2017.01) |
| *G06V 10/771* | (2022.01) |
| *G06V 10/80* | (2022.01) |
| *G06V 10/82* | (2022.01) |

(52) U.S. Cl.
CPC .............. *G06V 20/588* (2022.01); *G06T 5/20* (2013.01); *G06T 7/11* (2017.01); *G06V 10/771* (2022.01); *G06V 10/803* (2022.01); *G06V 10/82* (2022.01); *G06T 2207/30256* (2013.01)

(58) Field of Classification Search
CPC .. G06V 20/588; G06V 10/771; G06V 10/803; G06V 10/82; G06T 5/20; G06T 7/11; G06T 2207/30256; G06N 3/0464; G06N 3/08; G06N 3/045; G06F 18/241
USPC ...................................................... 348/148
See application file for complete search history.

(56) References Cited

U.S. PATENT DOCUMENTS

| | | | | |
|---|---|---|---|---|
| 11,600,080 B2* | 3/2023 | Yoo | ........................... | G06T 7/11 |
| 11,620,522 B2* | 4/2023 | Potnis | ................... | G06F 18/217 |
| | | | | 382/104 |
| 11,912,277 B2* | 2/2024 | Yang | ............... | B60W 30/18154 |
| 11,967,080 B2* | 4/2024 | Mustafi | ................. | G06V 10/96 |
| 2020/0143241 A1* | 5/2020 | Gao | ....................... | G06F 18/217 |
| 2020/0285869 A1* | 9/2020 | Mansour | ............... | G06N 5/046 |
| 2022/0350993 A1* | 11/2022 | Ghazi Mansour | ..... | G06V 10/82 |

(Continued)

*Primary Examiner* — Tung T Vo
(74) *Attorney, Agent, or Firm* — Fish & Richardson P.C.

(57) ABSTRACT

This disclosure discloses lane line detection methods and devices. In an implementation, features extracted by different layers of the neural network are fused to obtain a fused second feature map, so that the second feature map obtained through fusion processing has a plurality of layers of features. The fused second feature map has a related feature of a low-layer receptive field and a related feature of a high-layer receptive field. Afterwards, an output predicted lane line set is divided into groups, where each predicted lane line in each group has an optimal prediction interval.

20 Claims, 22 Drawing Sheets

(56) References Cited

U.S. PATENT DOCUMENTS

| | | | |
|---|---|---|---|
| 2023/0074419 A1* | 3/2023 | Alibeiginabi | G06V 20/588 |
| 2023/0326219 A1* | 10/2023 | Lee | G01C 21/3658 |
| 2024/0096109 A1* | 3/2024 | Sharma | G06N 3/0464 |

* cited by examiner

Image 1

Image 2

Different long tails in lane line detection

LANE LINE DETECTION METHOD AND RELATED DEVICE

CROSS-REFERENCE TO RELATED APPLICATIONS

This application is a continuation of International Application No. PCT/CN2021/092070, filed on May 7, 2021, which claims priority to Chinese Patent Application No. 202010538270.3, filed on Jun. 12, 2020. The disclosures of the aforementioned applications are hereby incorporated by reference in their entireties.

TECHNICAL FIELD

This disclosure relates to the field of artificial intelligence, and in particular, to a lane line detection method and a related device.

BACKGROUND

The intelligent driving (for example, autonomous driving and assistant driving) technology relies on coordination and cooperation of artificial intelligence, visual computing, radar, a monitoring apparatus, and a global positioning system, so that a vehicle can implement autonomous driving without an active operation of a human. A first step of autonomous driving is environment information collection and processing, and as one of main indication information on a road surface, a lane line can effectively guide an intelligent vehicle to travel in a restricted road region. Therefore, how to accurately detect the lane line on the road surface in real time is an important step in design of a system related to the intelligent vehicle, which can facilitate functions such as path planning assistance and road deviation warning, and can provide a reference for precise navigation.

Currently, a commonly used lane line detection method is lane line detection based on a convolution feature. Specifically, a to-be-detected image is input to a neural network for feature extraction, and then an extracted feature (each feature map is divided into a plurality of grids in advance) is decoded by using a prediction head model to generate dense line clusters (that is, a plurality of predicted lane lines). Finally, the line clusters are sorted based on a value of a confidence level of each predicted lane line (which may also be referred to as a confidence level of the grid, where the confidence level reflects whether a lane line passes through the grid and a probability that a lane line passes through the grid, a grid whose confidence level is greater than a preset value is used to predict a lane line, and a grid whose confidence level is less than the preset value is considered as having no contribution to prediction). Lane lines are put into a group by using a predicted lane line whose confidence level has a maximum value as a base line and using that spacing between another predicted lane line and the base line is less than a threshold as a condition. The line clusters are divided into several groups in a similar manner, and a base line in each group is selected for output as a final detection result for a real lane line in the group.

A premise exists in the foregoing lane line detection manner. It is assumed that each grid can accurately predict an entire lane line that passes through the grid. However, an actual lane line spans an excessively long distance, and it is difficult to effectively predict a part that is of the lane line and that is far away from a center of the grid.

SUMMARY

Embodiments of this disclosure provide a lane line detection method and a related device, to perform feature fusion on first feature maps output by different layers of a trained neural network to obtain a second feature map, and integrate a plurality of lane line prediction results obtained based on the second feature map, to improve precision of lane line detection.

Based on this, embodiments of this disclosure provide the following technical solutions.

According to a first aspect, an embodiment of this disclosure first provides a lane line detection method, which may be used in the image processing field. The method includes: First, a detection device performs feature fusion on first feature maps output by different layers of a trained neural network to obtain one or more second feature maps, where the one or more second feature maps are fused feature maps. This is because feature maps extracted by different layers of the neural network have different performance. A low-layer feature map has higher resolution and includes more location and detail information. However, the low-layer feature map undergoes less convolution, and therefore has lower semantics and more noise. A high-layer feature map has stronger semantic information, but has low resolution and a relatively low capability of perceiving a detail. Therefore, the second feature map obtained by performing feature fusion on the feature maps extracted by different layers of the neural network has features of a plurality of layers. Each obtained second feature map may be divided into a plurality of grids. If a grid whose confidence level has a value greater than a preset threshold (for example, the preset threshold is 0.6) exists in the plurality of grids, the confidence level greater than the preset threshold may be referred to as a first confidence level, and a grid corresponding to the first confidence level may be referred to as a first grid. After the first confidence level of each first grid is obtained, a predicted lane line (that is, a first predicted lane line) corresponding to each first grid may be further obtained by using a trained prediction head model. A real lane line usually causes responses of a plurality of grids, and therefore many prediction results correspond to a real lane line in a prediction phase. After n first predicted lane lines corresponding to n first grids are obtained based on the prediction head model, the n first predicted lane lines obtained through prediction need to be divided into m groups, where each group includes at least one predicted lane line. If a specific group in the m groups includes q first predicted lane lines, the q first predicted lane lines are integrated based on q first confidence levels respectively corresponding to the q first predicted lane lines and q first grids respectively corresponding to the q first predicted lane lines, to obtain a second predicted lane line. The second predicted lane line is output as a detection result for a real lane line in the second feature map.

In the foregoing implementation of this disclosure, first, through a feature fusion process, the output second feature map fuses a plurality of layers of features of the first feature maps output by different layers of the neural network. The second feature map has a related feature of a low-layer receptive field, which facilitates accurate regression of a lane line, and further has a related feature of a high-layer receptive field, which helps determining whether a lane line exists. Then, an output predicted lane line set is divided into groups, and due to limitation of a receptive field, each predicted lane line in each group has an optimal prediction interval. In this embodiment of this disclosure, the optimal prediction interval of each line is selected to integrate lane lines. Finally, a finally output predicted lane line is formed by combining advantages of different predicted lane lines.

In a possible implementation, if a first group in the m groups includes q first predicted lane lines (q≥2), a region occupied by the q first predicted lane lines in the second feature map may be divided into a plurality of sub-regions, and each sub-region includes a central point location (anchor point location) of at least one of q first grids. If a first sub-region in the plurality of sub-regions includes anchor point locations of at least two first grids, a first grid is selected from the at least two first grids as a second grid based on first confidence levels respectively corresponding to the at least two first grids. For example, a first grid whose first confidence level has a maximum value is selected from the at least two first grids as the second grid, and a part that is of a first predicted lane line corresponding to the second grid and that is located in the first sub-region is used as a first part of the second predicted lane line; or a weighting operation is performed on parts that are of first predicted lane lines respectively corresponding to the at least two first grids and that are located in the first sub-region, and an obtained operation result is used as the first part of the second predicted lane line. If a second sub-region in the plurality of sub-regions includes an anchor point location of only one first grid, a part that is of a first predicted lane line corresponding to the first grid included in the second sub-region and that is located in the second sub-region is used as a second part of the second predicted lane line. Finally, the first part is integrated with the second part to obtain a finally output second predicted lane line.

In the foregoing implementation of this disclosure, how to integrate a plurality of first predicted lane lines in a group is specifically described. To be specific, advantages of the plurality of first predicted lane lines are selected for integration, to form a finally output detection result, that is, a second predicted lane line. The finally output second predicted lane line fuses the advantages of the plurality of first predicted lane lines, so that detection precision is improved.

In a possible implementation, that a first grid is selected from the at least two first grids as a second grid based on first confidence levels respectively corresponding to the at least two first grids may be specifically: A first grid whose first confidence level has a maximum value is selected from the at least two first grids as the second grid.

In the foregoing implementation of this disclosure, a manner of determining the second grid is described, to be specific, the first grid whose first confidence level has a maximum value is selected. This is flexible and convenient and is more applicable to an actual use scenario.

In a possible implementation, when the first group in the m groups includes only one first predicted lane line, the first predicted lane line in the first group is directly output as a detection result for a real lane line in the second feature map.

In the foregoing implementation of this disclosure, it is indicated that when there is only one first predicted lane line in a group, integration is not required, and the first predicted lane line is directly output as a prediction result. Different quantities of first predicted lane lines in a group respectively correspond to different processing manners. This has flexibility and also meets actual application.

In a possible implementation, both a neural network and a feature fusion model are determined after training, a plurality of network structures may be selected for the neural network, and a plurality of feature fusion models are also constructed in this embodiment of this disclosure. Therefore, how to select a neural network (which may be referred to as a target neural network) and a feature fusion model (which may be referred to as target feature fusion model) from the plurality of neural networks and the plurality of feature fusion models is extremely important. In some implementations of this disclosure, the neural network and the feature fusion model may be obtained in but unnecessarily in the following manner: Search space formed by a plurality of existing neural networks and a plurality of feature fusion models constructed in this disclosure is searched to obtain a combination of "neural network+feature fusion model". Specifically, first, search space for "neural network+feature fusion model" is constructed, that is, a code combination corresponding to each pair of "neural network+feature fusion model". Each search process includes performing sampling in the search space. After sampling, a character string (that is, a code combination) representing "neural network+feature fusion model" may be obtained, and a specific instance for "neural network+feature fusion model", that is, a specific structure of a lane line detection network, is generated based on the character string. Then, the instance is trained by using training data in a training set to obtain a trained lane line detection network, and performance evaluation is performed on the trained lane line detection network after the training is completed, to obtain network performance. Similarly, the foregoing operation is performed for each sampling point to obtain performance of a lane line detection network corresponding to the sampling point. When a quantity of sampling times reaches a preset quantity of times, for example, 400 times, correspondingly obtained lane line detection networks also have 400 types of network structures, and performance of the 400 lane line detection networks is also obtained through performance evaluation. Afterwards, a lane line detection network is selected from the 400 lane line detection networks as a final target lane line detection network based on a preset condition that is set in advance in this disclosure, where the target lane line detection network includes a corresponding target neural network and a corresponding target feature fusion model. Finally, a feature may be extracted from a to-be-detected image by using the target neural network in the target lane line detection network to obtain first feature maps output by different layers of the target neural network. The first feature maps output by different layers are further used as input of the target feature fusion model, and the target feature fusion model outputs the second feature map.

In the foregoing implementation of this disclosure, the search space for the neural network and the feature fusion model is constructed, and a target neural network and a target feature fusion model that meet a requirement are obtained through searching. In this searching manner, related structures of a target neural network and a target feature fusion model that best match a detection task can be selected from a large quantity of neural networks and feature fusion models, thereby indirectly improving detection performance of a model.

In a possible implementation, the target feature fusion model may be selected through searching from a plurality of feature fusion models constructed in advance in this disclosure. Specifically, in this embodiment of this disclosure, first, a plurality of feature fusion models are constructed according to a plurality of preset fusion rules. Each constructed feature fusion model corresponds to one fusion rule, and one of the fusion rules is illustrated below. At least two high-resolution first feature maps are separately operated by using at least one first convolution kernel to obtain at least two third feature maps. Then, resolution of the at least two obtained third feature maps is processed to obtain at least two fourth feature maps having same resolution as a low-resolution first feature map. Finally, the at least two fourth feature maps are fused with the low-resolution first feature map in a preset combination manner to obtain at least one second feature map.

In the foregoing implementation of this disclosure, because the feature fusion model is constructed according to the preset fusion rule (that is, a preset rule) in this embodiment of this disclosure, and different feature fusion models are constructed according to different fusion rules. Therefore, one of the fusion rules is described to help understand the fusion rule described in this disclosure.

In a possible implementation, that the resolution of the at least two obtained third feature maps is processed may be specifically: performing a downsampling operation, a pooling operation, a convolution operation, or the like on the at least two obtained third feature maps. This is not limited herein.

In the foregoing implementation of this disclosure, several processing manners of reducing resolution are specifically described, which are optional.

In a possible implementation, a manner of selecting a lane line detection network from a plurality of sampled lane line detection networks as a final target lane line detection network based on a preset condition that is set in advance in this disclosure may specifically include but is not limited to the following manner: A lane line detection network whose performance is optimal in performance of the lane line detection networks corresponding to all sampling points is selected as the target lane line detection network.

In the foregoing implementation of this disclosure, it is indicated that a manner of meeting the preset condition is that performance is optimal. This meets a requirement in an actual application scenario, and indirectly improves overall performance of a device.

In a possible implementation, an initial confidence level of a first grid may be first obtained, and then the initial confidence level of each first grid is adjusted in a preset manner to obtain a first confidence level of the first grid.

In the foregoing implementation of this disclosure, it is indicated that the first confidence level of the first grid is obtained by adjusting the initial confidence level of the first grid. This is because the initial confidence level is a roughly estimated value, and precision is not high enough when the initial confidence level is used in a lane line prediction process. A purpose of the adjustment is to make prediction for a remote end of a lane line more accurate in the prediction process.

In a possible implementation, first, a statistical model is established based on distribution of anchor point locations of grids in which remote ends of real lane lines in images in a training set are located, where the statistical model has at least one to-be-determined parameter. Then, the parameter in the statistical model is estimated based on a statistical result for the anchor point locations of the grids in which the remote ends of the real lane lines in the images in the training set are located, to obtain an estimated value of the parameter, and the estimated value of the parameter is adjusted in the foregoing process of training a lane line detection network (for example, training and fully training in the search process), to obtain a final determinate value of the parameter in the statistical model. Further, an anchor point location of the first grid is calculated by using the statistical model for which the determinate value of the parameter is determined, to obtain a weight value of the anchor point location of the first grid. Finally, an operation is performed on the initial confidence level of the first grid and the weight value to obtain the first confidence level of the first grid, for example, a product operation is performed on the initial confidence level of each first grid and a weight value of the anchor point location of each first grid, to obtain the first confidence level of the first grid.

In the foregoing implementation of this disclosure, a manner of obtaining the first confidence level based on a statistical method by using the initial confidence level is provided, which is operable.

In a possible design, the statistical model includes a Gaussian function.

In the foregoing implementation of this disclosure, the statistical model may be modeled as the Gaussian function because a horizontal central cross-section of a frequency heatmap for anchor point locations of grids in which remote ends of lane lines are located approximates to the Gaussian function.

A second aspect of embodiments of this disclosure further provides a lane line detection framework. The framework may specifically include a neural network, a feature fusion model, a confidence level adjustment model, a prediction head model, and a predicted lane line integration model. The neural network is configured to extract a feature from an input to-be-detected image after being trained. The feature fusion model is configured to perform feature fusion on first feature maps output by different layers of the trained neural network, to obtain a second feature map. The confidence level adjustment model is configured to divide the second feature map into a plurality of grids, and obtain a first confidence level of a first grid in the plurality of grids, where the first confidence level is used to indicate a first probability that a real lane line in the second feature map passes through the first grid, and the first probability exceeds a first preset threshold. The prediction head model is configured to obtain, after being trained, a first predicted lane line corresponding to the first grid. The predicted lane line integration model is configured to: when there are n first grids, divide n first predicted lane lines into m groups, where m≤n and n≥2. The predicted lane line integration model is further configured to: when a first group in the m groups includes q first predicted lane lines, integrate the q first predicted lane lines based on q first confidence levels respectively corresponding to the q first predicted lane lines and q first grids respectively corresponding to the q first predicted lane lines, to obtain a second predicted lane line, where the second predicted lane line is output as a detection result for a real lane line in the second feature map, and q≥2.

In a possible design, the predicted lane line integration model is specifically configured to: divide a region occupied by the q first predicted lane lines in the second feature map into a plurality of sub-regions, where each sub-region includes a central point location of at least one of the q first grids; when a first sub-region in the plurality of sub-regions includes central point locations of at least two first grids, select a first grid from the at least two first grids as a second grid based on first confidence levels respectively corresponding to the at least two first grids, and use, as a first part of the second predicted lane line, a part that is of a first predicted lane line corresponding to the second grid and that is located in the first sub-region; or perform a weighting operation on parts that are of first predicted lane lines corresponding to the at least two first grids and that are located in the first sub-region, and use an obtained operation result as the first part of the second predicted lane line; when a second sub-region in the plurality of sub-regions includes a central point location of only one first grid, use, as a second part of the second predicted lane line, a part that is of a first predicted lane line corresponding to the first grid included in the second sub-region and that is located in the second sub-region; and integrate the first part with the second part to obtain the second predicted lane line.

In a possible design, the predicted lane line integration model is further specifically configured to: select, from the at least two first grids based on the first confidence levels respectively corresponding to the at least two first grids, a first grid whose first confidence level has a maximum value as the second grid.

In a possible design, the predicted lane line integration model is further configured to: when the first group in the m groups includes only one first predicted lane line, output the first predicted lane line in the first group as a detection result for a real lane line in the second feature map.

In a possible design, the feature fusion model is specifically configured to: construct search space, where the search space is formed by combining code of a plurality of neural networks and code of a plurality of feature fusion models, and the plurality of feature fusion models are constructed according to a plurality of preset rules; perform sampling in the search space to obtain a first sampling point, where the first sampling point is a first code combination formed by code of a first neural network and code of a first feature fusion model; generate a first lane line detection network based on the first code combination, and train the first lane line detection network by using a training set; perform performance evaluation based on the trained first lane line detection network; when a quantity of sampling times reaches a preset value and performance of the trained first lane line detection network meets a preset condition, extract a feature from a to-be-detected image by using the first neural network in the trained first lane line detection network, to obtain first feature maps output by different layers of the first neural network; and use the first feature maps output by different layers of the first neural network as input of the first feature fusion model in the trained first lane line detection network, to output the second feature map.

In a possible design, the feature fusion model is further specifically configured to: separately operate at least two high-resolution first feature maps by using at least one first convolution kernel to obtain at least two third feature maps; process resolution of the at least two third feature maps to obtain at least two fourth feature maps having same resolution as a low-resolution first feature map; and fuse the at least two fourth feature maps with the low-resolution first feature map in a preset combination manner to obtain at least one second feature map.

In a possible design, the feature fusion model is further specifically configured to perform a downsampling operation, a pooling operation, or a convolution operation on the at least two third feature maps.

In a possible design, that performance of the trained first lane line detection network meets a preset condition includes: Performance of the trained first lane line detection network is optimal in performance of lane line detection networks corresponding to all sampling points.

In a possible design, the confidence level adjustment model is specifically configured to: divide the second feature map into a plurality of grids, and obtain an initial confidence level of a first grid in the plurality of grids, where the initial confidence level is used to indicate an initial probability that a real lane line in the second feature map passes through the first grid, and the initial probability exceeds an initial preset threshold; and adjust the initial confidence level in a preset manner to obtain a first confidence level of the first grid.

In a possible design, the confidence level adjustment model is further specifically configured to: establish a statistical model based on distribution of central point locations of grids in which remote ends of real lane lines in images in a training set are located, where the statistical model has at least one to-be-determined parameter; estimate the parameter based on a statistical result for the central point locations of the grids in which the remote ends of the real lane lines in the images in the training set are located, to obtain an estimated value of the parameter; adjust the estimated value of the parameter in a training process to obtain a determinate value of the parameter; calculate a central point location of the first grid by using the statistical model for which the determinate value of the parameter is determined, to obtain a weight value of the central point location of the first grid; and perform an operation on the initial confidence level of the first grid and the weight value to obtain the first confidence level of the first grid.

In a possible design, the statistical model includes a Gaussian function.

In a possible design, the trained framework is deployed on a detection device.

In a possible design, the detection device includes a wheeled mobile device, for example, may be a wheeled construction device, an autonomous driving vehicle, an assistant driving vehicle, or the like. Any wheeled movable device is referred to as the wheeled mobile device in this disclosure. For ease of understanding, in the following embodiments of this disclosure, that the wheeled mobile device is the autonomous driving vehicle is used as an example for description. The autonomous driving vehicle may be a car, a truck, a motorcycle, a bus, a boat, aircraft, a helicopter, a lawn mower, a recreational vehicle, an amusement park vehicle, a construction device, a tram, a golf cart, a train, a trolley, and the like. This is not specially limited in embodiments of this disclosure.

A third aspect of embodiments of this disclosure provides a detection device, and the detection device has a function of implementing the method according to any one of the first aspect or the possible implementations of the first aspect. The function may be implemented by hardware, or may be implemented by hardware executing corresponding software. The hardware or the software includes one or more modules corresponding to the function.

A fourth aspect of embodiments of this disclosure provides a detection device, which may include a memory, a processor, and a bus system. The memory is configured to store a program, and the processor is configured to invoke the program stored in the memory to perform the method according to any one of the first aspect or the possible implementations of the first aspect of embodiments of this disclosure.

A fifth aspect of this disclosure provides a computer-readable storage medium. The computer-readable storage medium stores instructions, and when the instructions are run on a computer, the computer is enabled to perform the method according to any one of the first aspect or the possible implementations of the first aspect.

A sixth aspect of embodiments of this disclosure provides a computer program or a computer program product. When the computer program or the computer program product is run on a computer, the computer is enabled to perform the method according to any one of the first aspect or the possible implementations of the first aspect.

DESCRIPTION OF EMBODIMENTS

Figure 1:
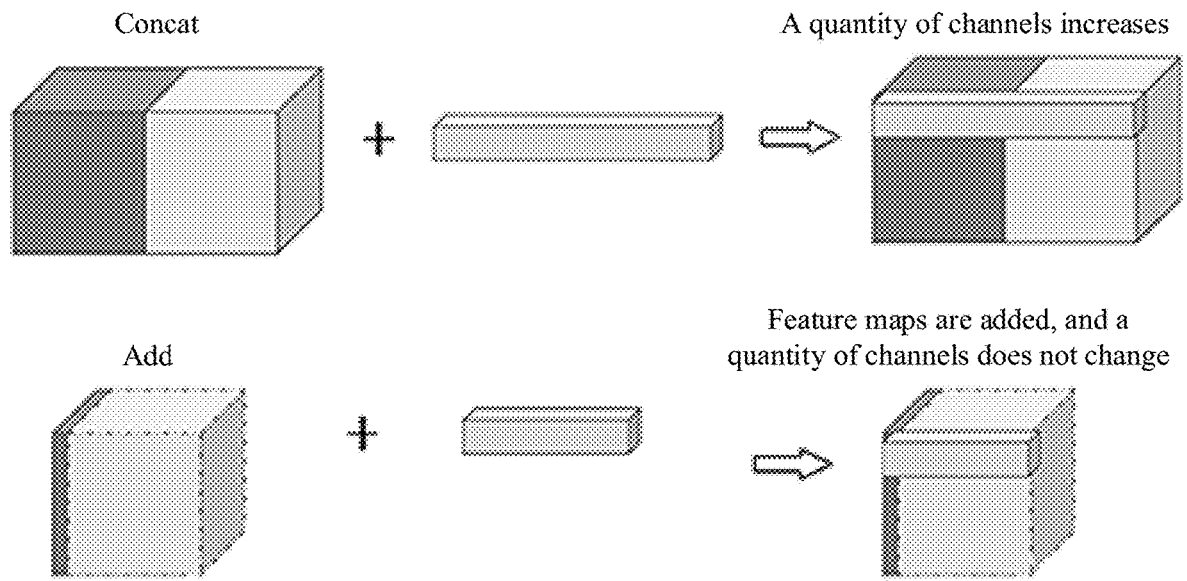
FIG. 1 is a schematic diagram of comparison between two feature fusion manners.

Embodiments of this disclosure provide a lane line detection method and a related device, to perform feature fusion on first feature maps output by different layers of a trained neural network to obtain a second feature map, and integrate a plurality of lane line prediction results obtained based on the second feature map, to improve precision of lane line detection.

Terms "first" and "second" in the specification and claims of this disclosure, and the foregoing accompanying drawings are used to distinguish between similar objects, and do not need to be used to describe a specific order or sequence. It should be understood that the terms used in such a way are interchangeable in proper circumstances, which is merely a discrimination manner that is used when objects having a same attribute are described in embodiments of this disclosure. In addition, terms "include", "have", and any modification thereof are intended to cover non-exclusive inclusion, so that processes, methods, systems, products, or devices that include a series of units are not necessarily limited to those units, but may include other units that are not clearly listed or are inherent to these processes, methods, products, or devices.

Embodiments of this disclosure relate to much knowledge related to lane line detection and a neural network. To better understand the solutions of embodiments of this disclosure, related concepts and background knowledge that may be related to embodiments of this disclosure are first described below.

(1) Neural Network

The neural network may include a neural unit, and may be specifically understood as a neural network having an input layer, a hidden layer, and an output layer. Generally, the first layer is the input layer, the last layer is the output layer, and all middle layers are hidden layers. A neural network having many hidden layers is referred to as a deep neural network (deep neural network, DNN). Working in each layer of the neural network may be described by using a mathematical expression $\vec{y}=a(W\cdot\vec{x}+b)$. In a physical aspect, working in each layer of the neural network may be understood as completing transformation from input space to output space (that is, from row space to column space of a matrix) by performing five operations on the input space (a set of input vectors). The five operations include: 1. dimension raising/dimension reduction; 2. amplification/reduction; 3. rotation; 4. translation; and 5. "bending". The operations 1, 2 and 3 are completed by "$W\cdot\vec{x}$", the operation 4 is completed by "+b", and the operation 5 is implemented by "a( )". Herein, the word "space" is used for description because a classified object is not a single object but a type of object. Space refers to a set of all individuals of this type of object. W is a weight matrix in each layer of the neural network, and each value in the matrix represents a weight value of a neuron in the layer. The matrix W determines the foregoing space transformation from the input space to the output space, that is, W in each layer of the neural network controls how to perform space transformation. A purpose of training the neural network is to finally obtain weight matrices in all layers of the trained neural network. Therefore, a process of training the neural network is essentially learning a manner of controlling space transformation, and more specifically, learning the weight matrix. In the process of training the neural network, because it is expected that output of the neural network is as close as possible to a value truly expected to predict, a predicted value of a current network may be compared with a truly expected target value, and then the weight matrix in each layer of the neural network is updated based on a difference between the two values (certainly, there is usually an initialization process before the first time of update, that is, a parameter is pre-configured for each layer of the neural network). For example, if the predicted value of the network becomes higher, the weight matrix is adjusted so that the network predicts a lower value. The neural network is continuously adjusted until the neural network can predict the truly expected target value. Therefore, "how to obtain, through comparison, a difference between the predicted value and the target value" needs to be predefined. This is a loss function (loss function) or an objective function (objective function). The loss function and the objective function are important equations that measure the difference between the predicted value and the target value. The loss function is used as an example. A higher output value (loss) of the loss function indicates a larger difference. Therefore, training of the neural network is a process of minimizing the loss as much as possible.

(2) Feature Fusion (Feature Fusion)

Anew feature is generated by using a specific method based on different features extracted by a neural network, so that the new feature is more effective for classification, identification, detection, or the like. Feature fusion usually has two manners: "concat" and "add". "Concat" is a manner of fusing a series of features, that is, two features are directly connected. If quantities of dimensions of two input features x and y are p and q, a quantity of dimensions of an output feature z is "p+q". "Add" is a parallel fusion policy and is to combine two feature vectors. For input features x and y, a new feature z with channel quantity the same as a channel quantity of each of x and y is obtained. Specifically, as shown in FIG. 1, in other words, "add" means that an amount of information in a feature that describes an image increases but a quantity of dimensions that describe the image does not increase, and only an amount of information in each dimension increases. However, "concat" is combination of channels, to be specific, a quantity of features that describe an image increases, but an amount of information in each feature does not increase.

(3) Wheeled Mobile Device

The wheeled mobile device is a comprehensive system that integrates a plurality of functions such as environment perception, dynamic decision and planning, and behavior control and execution, and may also be referred to as a wheeled mobile robot or a wheeled agent, for example, may be a wheeled construction device, an autonomous driving vehicle, an assistant driving vehicle, or the like. Any wheeled movable device is referred to as the wheeled mobile device in this disclosure. For ease of understanding, in the following embodiments of this disclosure, that the wheeled mobile device is the autonomous driving vehicle is used as an example for description. The autonomous driving vehicle may be a car, a truck, a motorcycle, a bus, a boat, aircraft, a helicopter, a lawn mower, a recreational vehicle, an amusement park vehicle, a construction device, a tram, a golf cart, a train, a trolley, and the like. This is not specially limited in this embodiment of this disclosure.

(4) Perception

A primary condition for secure autonomous driving is ensuring perception accuracy. From a sensor perspective, there may be a plurality of perception modules, such as a laser perception module, a visual perception module, and a millimeter wave perception module. As one of key modules, the visual perception module is widely used in an advanced driver assistant system (ADAS) and an autonomous driving system (ADS), and can provide related information (such as a lane line on a road surface) of a surrounding environment to a wheeled mobile device (such as an autonomous driving vehicle) installed with the module. The related information may also be referred to as perception information, and the perception information provides a solid basis for planning and controlling a proper decision.

Figure 2:
FIG. 2 is a schematic diagram of two images on a traveling road surface that are photographed by a camera installed on a self-owned vehicle.
Figure 2:
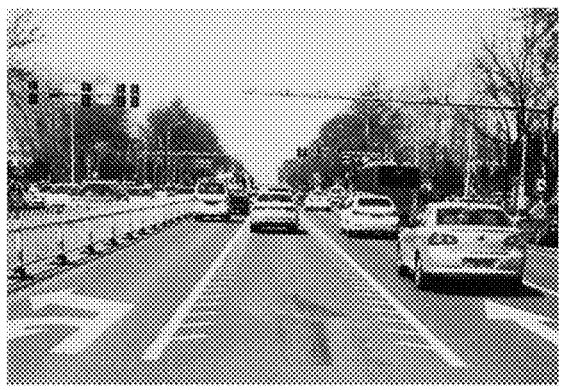
Figure 3:
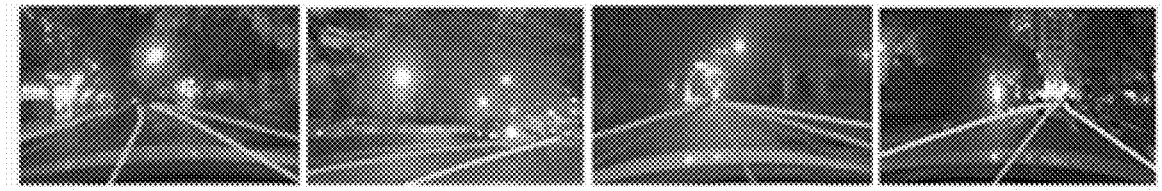
FIG. 3 is a schematic diagram of a visual effect of a lane line predicted by using a lane line detection algorithm.

In embodiments of this disclosure, the used perception information is a video (an image needs to be extracted subsequently) or an image that is related to a road surface on which a self-owned vehicle travels and that is photographed by the visual perception module (for example, a camera mounted on the wheeled mobile device). As shown in FIG. 2, the perception information is two images (an image 1 and an image 2) of a traveling road surface that are photographed by a camera mounted on the self-owned vehicle. The obtained related image is used as a to-be-detected image and is used to detect a lane line on a traveling road surface. FIG. 3 shows a lane line location predicted by detecting, by using a lane line detection algorithm, a to-be-detected image that is input in real time by the visual perception module, and a visual result is shown in FIG. 3. Four obtained to-be-detected images are respectively detected, and four, two, five, and three predicted lane lines are output.

(5) Target Detection and Lane Line Detection

Target detection, also referred to target extraction, is image segmentation based on target geometry and a statistical feature. Target detection focuses on a specific object target in an image, and requires to simultaneously obtain category information and location information of the specific object target. Accuracy and real-time quality of target detection are important capabilities of an entire system. Target detection is applied in many scenarios, such as a security system in unmanned driving, an intelligent transportation system, and an intelligent monitoring system.

Figure 4:
FIG. 4 is a schematic diagram of different long tails in lane line detection.

Lane line detection may be considered as special target detection because there is a relatively large difference between common target detection and lane line detection in terms of a target feature. A region occupied by a target object (for example, a cat, a dog, and a face) in common target detection has a length-to-width ratio and is easy to be identified. However, a lane line in lane line detection is thin and long, spans a relatively long distance, has a relatively narrow width, and is not easy to be identified because it is difficult to accumulate enough robust features to describe the entire lane line. This poses a strict requirement for a neural network, and therefore, lane line detection is more challenging than common target detection. In addition, a driving scenario is usually quite complex. As an automation level of an autonomous driving vehicle is increasingly high, some long-tail phenomena in lane line detection are also increasingly valued. As shown in FIG. 4, a long-tail phenomenon exists in each of a curved lane line, a remote lane line, a forked lane line, and the like. Whether these lane lines are well detected determines whether security performance of an autonomous driving vehicle is fairly good.

In the intelligent driving field, lane line detection is extremely important for accurate positioning of an autonomous driving vehicle and has extremely important impact on a driving decision. In addition, as one piece of main indication information on a road surface, a lane line can effectively guide an intelligent driving vehicle to travel in a restricted road region. Real-time detection of a lane line on a road surface is an important step in an ADAS or ADS of the intelligent driving vehicle, which facilitates functions such as path planning assistance and road deviation warning, and can provide a reference for precise navigation. Existing lane detection methods are roughly classified into the following two types:

a. Manual Feature-Based Lane Line Detection

The manual feature-based lane line detection method relies on a manually created feature (including color, edge information, and the like). These features are combined with Hough transform and Kalman filter to detect a lane line, and has robust detection performance in most cases. However, this manual feature-based lane line detection manner cannot be well adapted to a complex and variable lane line in real life, and therefore cannot effectively provide a reliable lane line detection result for an autonomous driving downstream module (such as a planning and controlling system), and is rarely mentioned in autonomous driving study.

b. Convolution Feature-Based Lane Line Detection

Figure 5:
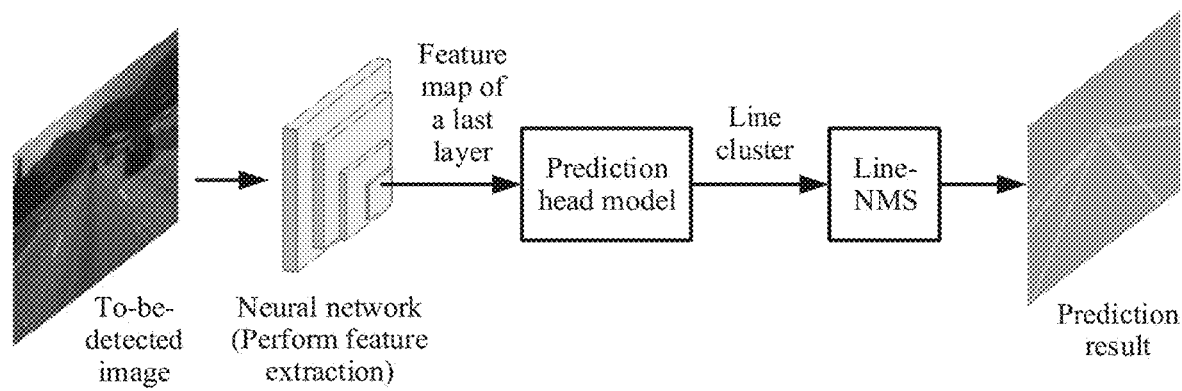
FIG. 5 is a schematic diagram of a typical lane line detection architecture.

With continuous development of deep learning, a plurality of lane line detection methods are developed in a current phase in the lane line detection field. A typical lane line detection architecture is shown in FIG. 5, and a main procedure of the lane line detection architecture is as follows: First, a to-be-detected image is input to a neural network (for example, a convolutional neural network) for feature extraction to obtain a feature map that is output by a last layer of the neural network, and the extracted feature map is decoded by using a prediction head model to generate dense line clusters (that is, a plurality of predicted lane lines). Finally, line non-maximum suppression (Line-NMS) processing is performed on the line cluster to output a final prediction result for a lane line in the to-be-detected image.

Figure 6:
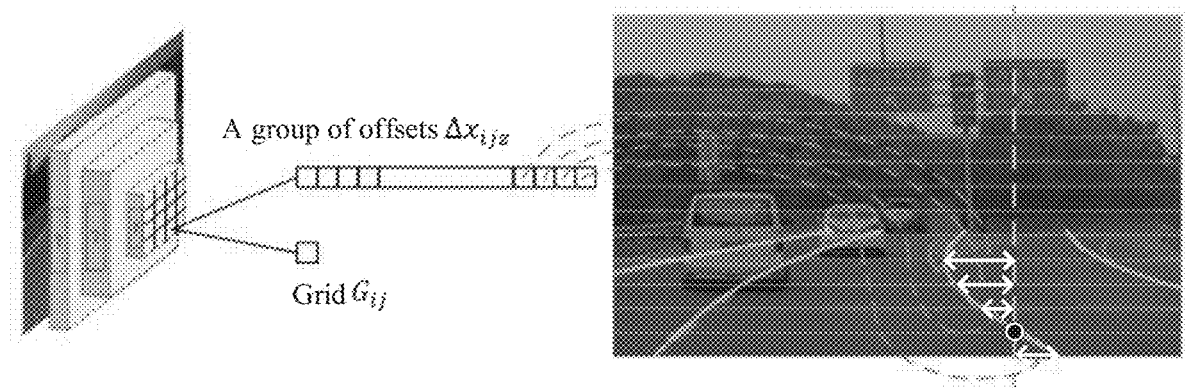
FIG. 6 is a schematic diagram of a working principle of a prediction head model.

Specifically, the prediction head model works in a manner shown in FIG. 6. First, the feature map that is output by the neural network is divided into a plurality of grids with a size of w×h. One of the grids may be denoted as $\{G_{ij}\}$, and a central point of each grid $G_{ij}$ on the feature map is referred to as an anchor point. If the central point of $G_{ij}$ is close to a real lane line on the ground, the $G_{ij}$ is responsible for detecting the lane line. Because a real lane line may span a plurality of grids, one lane line may correspond to a plurality of grids. A confidence level $S_{ij}$ of the grid $G_{ij}$ reflects a probability that a lane line passes through the grid $G_{ij}$. In a phase of training the prediction head model, each real lane line in a training image is marked. Therefore, in the training phase, there are only two cases for the probability that a lane line passes through the grid $G_{ij}$: If the lane line passes through the grid, a value of the confidence level $S_{ij}$ of the grid $G_{ij}$ is 1; or if the lane line does not pass through the grid, a value of the confidence level $S_{ij}$ of the grid $G_{ij}$ is 0. In a detection phase, whether a lane line exists in the feature map extracted by the neural network and that a lane line exists at a specific location exist in a form of a probability. Therefore, the probability that a lane line passes through the grid $G_{ij}$ is a probability that a lane line exists at a location of the grid. For each grid $G_{ij}$, the prediction head model predicts a group of offsets $\Delta x_{ijz}$ and an endpoint location (that is, a location at which a remote end of a lane line disappears on a feature map), where $\Delta x_{ijz}$ is a horizontal distance between a real lane line on the ground and a vertical line passing through an anchor point. A group of offsets $\Delta x_{ijz}$ shown in FIG. 6 includes four offsets shown by two-way arrows, where a black dot location is the anchor point. In the training phase, all real lane lines in an input training image are coded based on the foregoing description by using the prediction head model, to obtain a group of $\Delta x_{ijz}$ and an endpoint location that correspond to a grid through which each real lane line passes, and model output is corrected by using the group of $\Delta x_{ijz}$ and the endpoint location that correspond to each grid. In a prediction phase, each lane line in a to-be-detected image may be recovered by using $\Delta x_{ijz}$ and an endpoint location that are predicted by using the model. A real lane line in the to-be-detected image usually causes responses of a plurality of grids. Therefore, in the prediction phase, many predicted lane lines correspond to a prediction result for a real lane line, and processing needs to be performed by using Line-NMS to generate a final prediction result.

Figure 7:
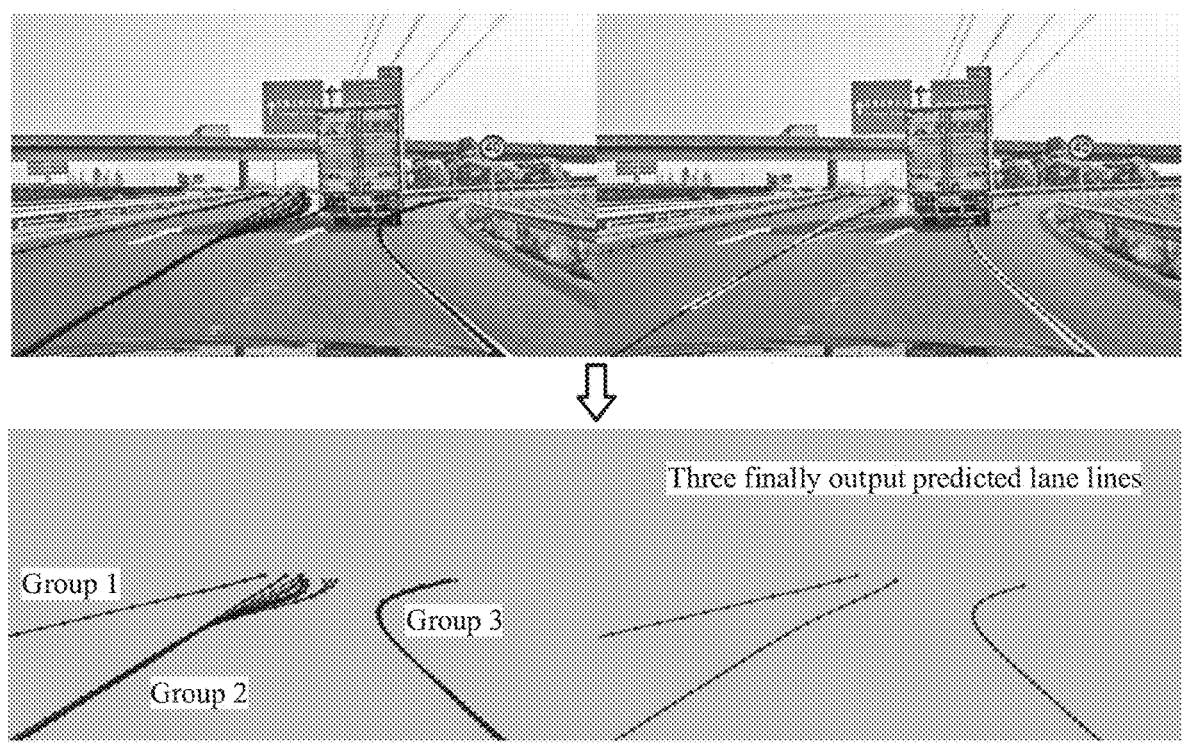
FIG. 7 is a schematic diagram of a predicted lane line obtained through Line-NMS processing.

A process of performing processing by using Line-NMS is specifically as follows: After line clusters (that is, a plurality of predicted lane lines) output by the prediction head model are obtained, the predicted lane lines are sorted based on values of confidence levels, and then lane lines are put into a group by using a predicted lane line whose confidence level has a maximum value as a base line and using that spacing between another predicted lane line and the base line is less than a threshold as a condition. The line clusters are divided into several groups in a similar manner, and a base line in each group is selected for output as a final detection result for a real lane line in the group. A predicted lane line that is output after Line-NMS processing is shown in a right part of FIG. 7, and three predicted lane lines are finally output. A left part of FIG. 7 shows grouping of all the predicted lane lines in the line clusters based on the values of the confidence levels (the predicted lane lines are divided into three groups).

The convolution feature-based lane line detection manner is relatively original, and there is a premise for designing an entire algorithm: It is assumed that each grid can accurately predict an entire lane line that passes through the grid. However, an actual lane line spans an excessively long distance, and it is difficult to effectively predict a part that is of the lane line and that is away from a central point of the grid. In addition, a receptive field of a network cannot be effectively extended by using a straight-type network backbone, which limits an expression capability of the network.

To resolve the existing problems related to lane line detection, embodiments of this disclosure provide a lane line detection method, to perform feature fusion on first feature maps output by different layers of a trained neural network to obtain a second feature map, and integrate a plurality of lane line prediction results obtained based on the second feature map, to improve precision of lane line detection.

The following describes embodiments of this disclosure with reference to the accompanying drawings. A person of ordinary skill in the art may learn that, with technology development and emergence of a new scenario, the technical solutions provided in embodiments of this disclosure are also applicable to a similar technical problem.

Figure 8:
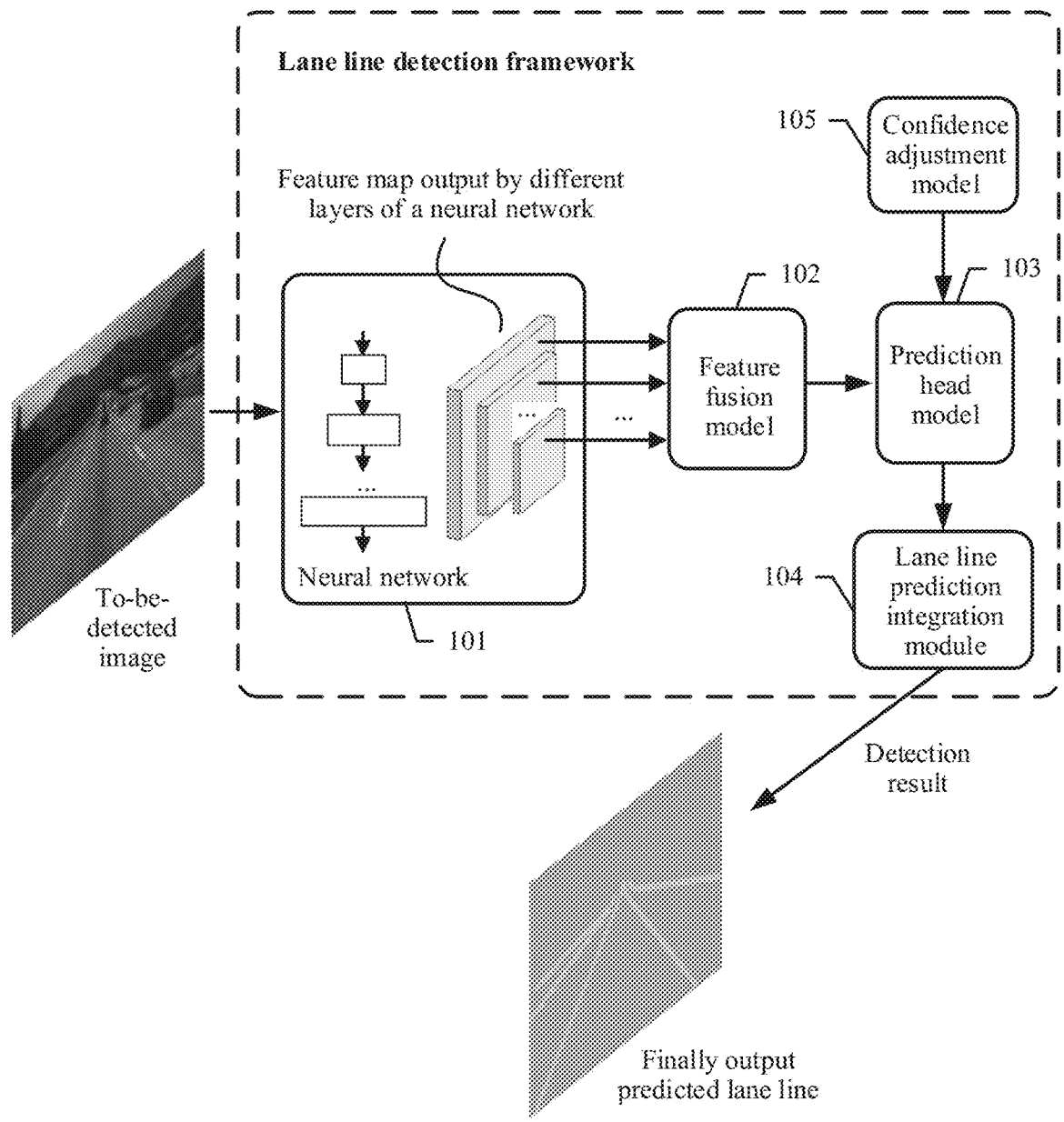
FIG. 8 is a schematic diagram of a trained constructed lane line detection framework according to an embodiment of this disclosure.

First, a framework for implementing a lane line detection function in embodiments of this disclosure is described. The framework may be referred to as a lane line detection framework (also referred to as a lane line detection algorithm). A lane line in a to-be-detected image is detected by using the lane line detection framework constructed in this disclosure. Specifically, FIG. 8 shows a trained lane line detection framework constructed in this disclosure. The lane line detection framework includes the following parts: a neural network 101, a feature fusion model 102, a prediction head model 103, and a predicted lane line integration module 104. The neural network 101 is configured to extract a feature from an input to-be-detected image to obtain a plurality of feature maps from different layers of the neural network 101. Features related to the to-be-detected image that are extracted from different feature maps are also different, some feature maps have a high-layer receptive field, and some feature maps have a low-layer receptive field. A search parameter may be set, and the neural network 101 is obtained through searching in search space formed by neural networks that meet the search parameter. The feature fusion model 102 is configured to perform feature fusion on the feature maps extracted by the neural network 101 in different layers, to obtain a fused feature map. The fused feature map has a low-layer receptive field to facilitate accurate regression of a lane line, and further has a high-layer receptive field to determine whether a lane line exists. A plurality of feature fusion models 102 may be constructed according to a plurality of different preset rules in this embodiment of this disclosure. Similarly, a search parameter is set, and the feature fusion model 102 is obtained through searching in the plurality of constructed feature fusion models that meet the specified search parameter. It should be noted that the neural network 101 may be obtained through searching in separately disposed search space, or may be obtained through searching in search space formed with a plurality of feature fusion models. Similarly, the feature fusion model 102 may be obtained through searching in separately disposed search space, or may be obtained through searching in search space formed by with a plurality of neural networks. This is not limited herein. The prediction head model 103 is a bridge for communication between a feature map and a real lane line, and is configured to perform decoding based on a fused feature map with different layers to generate a lane line corresponding to an original image. Specifically, the prediction head model 103 is configured to predict a lane line in a grid obtained by dividing the fused feature map. A lane line may be correspondingly predicted in each grid whose confidence level is higher than a preset threshold. The predicted lane line integration module 104 groups all predicted lane lines. Due to limitation of a receptive field, each lane line in each group has an optimal prediction interval. The predicted lane line integration module 104 selects the optimal prediction interval of each lane line to integrate lane lines, and finally combines prediction advantages of different lane lines to form a final lane line.

It should be noted that, in some implementations of this disclosure, the constructed lane line detection framework may further have a confidence level adjustment model 105. This is because an anchor point of a grid has a locality, and in an actual application scenario, a user is more concerned about precision of a remote end of a lane. To further improve prediction precision, the confidence level adjustment model 105 is configured to adjust an initial confidence level of a grid. A weight occupied by an anchor point of a grid corresponding to a remote end of a lane line is increased, and local information of the remote end of the lane line is fully used, to improve precision of the remote end of the lane line.

Figure 9:
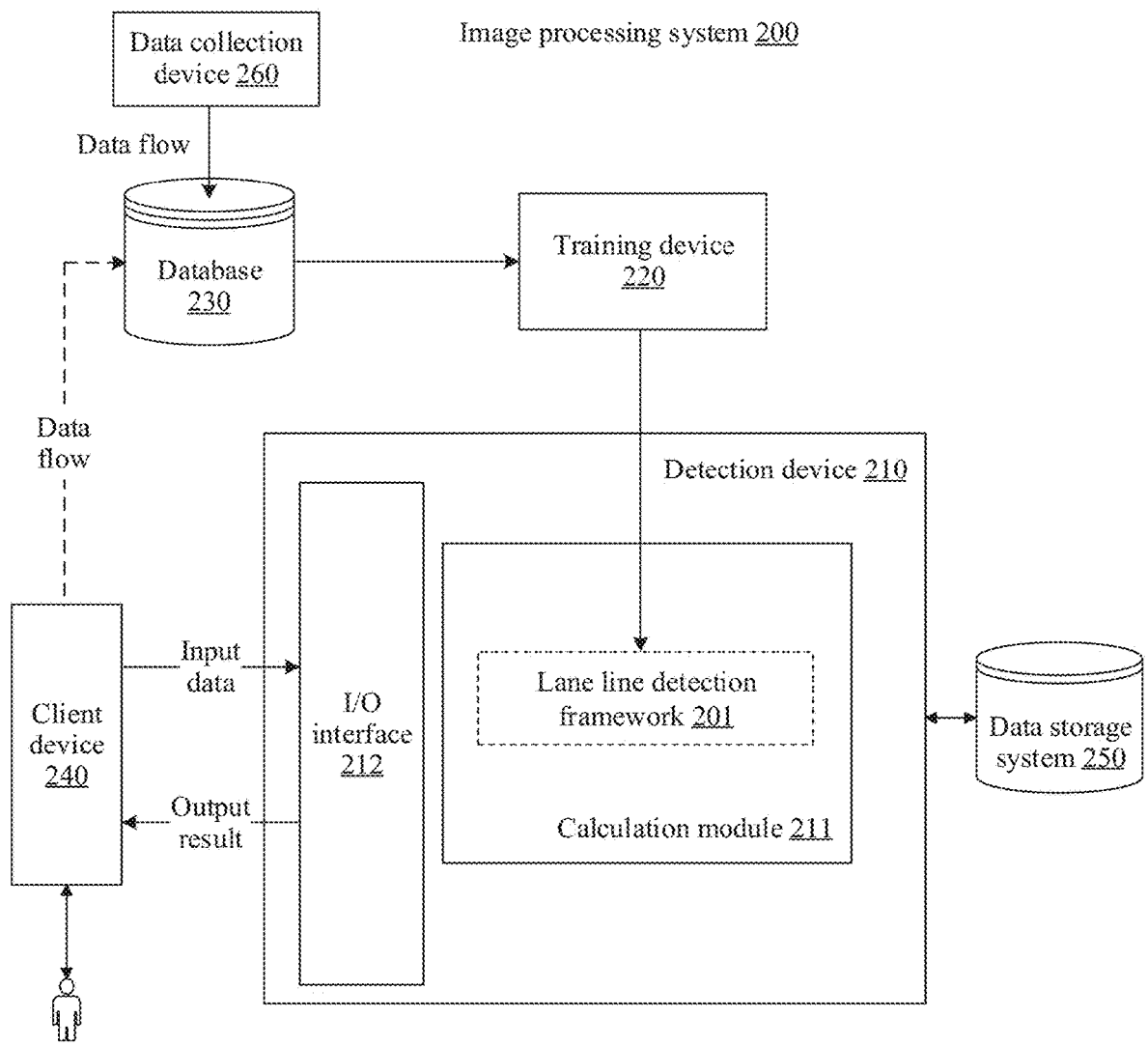
FIG. 9 is a schematic diagram of an architecture of an image processing system according to an embodiment of this disclosure.

It should be noted that the lane line detection framework described in FIG. 8 is a trained lane line detection framework. After the lane line detection framework is constructed, the entire lane line detection framework needs to be first trained, and only the trained lane line detection framework can be applied to a specific lane line detection task. Specifically, an entire training and detection procedure of a lane line detection framework may be described based on an image processing system 200 shown in FIG. 9. In FIG. 9, the image processing system 200 includes a detection device 210, a training device 220, a database 230, a client device 240, a data storage system 250, and a data collection device 260. The detection device 210 includes a calculation module 211, and the calculation module 211 is essentially a trained lane line detection framework 201 provided in this embodiment of this disclosure.

The data collection device 260 (for example, a camera mounted on a wheeled mobile device) is configured to obtain a large-scale open-source dataset (that is, a training set) required by a user, and store the dataset in the database 230. The training device 220 trains each model in the lane line detection framework 201 based on the dataset maintained in the database 230 (for example, trains the neural network 101 and the feature fusion model 102 shown in FIG. 8). The detection device 210 may invoke data, code, and the like in the data storage system 250, and may also store data, instructions, and the like in the data storage system 250. The data storage system 250 may be disposed in the detection device 210, or the data storage system 250 is an external memory relative to the detection device 210.

The lane line detection framework 201 trained by the training device 220 may be applied to different systems or devices (that is, the detection device 210). For example, the detection device 210 may be various wheeled mobile devices (a wheeled construction device, an autonomous driving vehicle, an assistant driving vehicle, and the like), and the autonomous driving vehicle may be a car, a truck, a motorcycle, a bus, a boat, aircraft, a helicopter, a lawn mower, a recreational vehicle, an amusement park vehicle, a construction device, a tram, a golf cart, a train, a trolley, and the like.

In FIG. 9, an I/O interface 212 is configured for the detection device 210 to exchange data with an external device. A "user" may input data to the I/O interface 212 by using the client device 240. For example, the client device 240 may be a photographing device mounted on an autonomous driving vehicle, and an image photographed by the photographing device is input to the calculation module 211 in the detection device 210 as input data. The lane line detection framework 201 in the calculation module 211 detects the input image to obtain a detection result, and then outputs the detection result to the photographing device or directly displays the detection result on a display interface (if there is a display interface) of the detection device 210. In addition, in some implementations of this disclosure, the client device 240 may be integrated into the detection device 210. For example, when the detection device 210 is an autonomous driving vehicle, a camera of the autonomous driving vehicle may directly photograph an image or receive an image sent by another device (for example, a mobile phone), and then the calculation module 211 in the autonomous driving vehicle detects the image to obtain a detection result, and directly presents the detection result on a display interface of the mobile phone. Product forms of the detection device 210 and the client device 240 are not limited herein.

It should be noted that FIG. 9 is only a schematic diagram of an architecture of an image processing system according to an embodiment of this disclosure. A location relationship between a device, a component, a module, and the like shown in the figure constitutes no limitation. For example, in FIG. 9, the data storage system 250 is an external memory relative to the detection device 210. In another case, the data storage system 250 may be disposed in the detection device 210. In FIG. 9, the client device 240 is an external device relative to the detection device 210. In another case, the client device 240 may be integrated into the detection device 210.

It should be further noted that, in some implementations of this disclosure, the lane line detection framework 201 may further be split into a plurality of submodules/subunits to jointly implement the solutions provided in embodiments of this disclosure. This is not specifically limited herein.

It should be further noted that training of the lane line detection framework 201 described in the foregoing embodiment may be completely implemented on a cloud side. For example, a training device 220 on the cloud side (the training device 220 may be disposed on one or more servers or virtual machines) may obtain a training set, and train the lane line detection framework based on a plurality of groups of training data in the training set to obtain the trained lane line detection framework 201. Afterwards, the trained lane line detection framework 201 is further sent to a detection device 210 for application, for example, the trained lane line detection framework 201 is sent to a related system (such as an ADAS or an ADS) of an autonomous driving vehicle to detect a lane line. For example, in the system architecture corresponding to FIG. 9, the training device 220 performs overall training on the lane line detection framework 201, and then the trained lane line detection framework 201 is sent to the detection device 210 for use. Training of the lane line detection framework 201 described in the foregoing embodiment may be completely implemented on a terminal side. To be specific, the training device 220 may be located on the terminal side. For example, a wheeled mobile device (such as an autonomous driving vehicle or an assistant driving vehicle) may obtain a training set, and train the lane line detection framework 201 based on a plurality of groups of training data in the training set to obtain the trained lane line detection framework. The trained lane line detection framework 201 can be directly used by a terminal device, or may be sent by the terminal device to another device for use. Specifically, a specific device (a cloud side or a terminal side) on which the lane line detection framework 201 is trained or applied is not limited in this embodiment of this disclosure.

Figure 10:
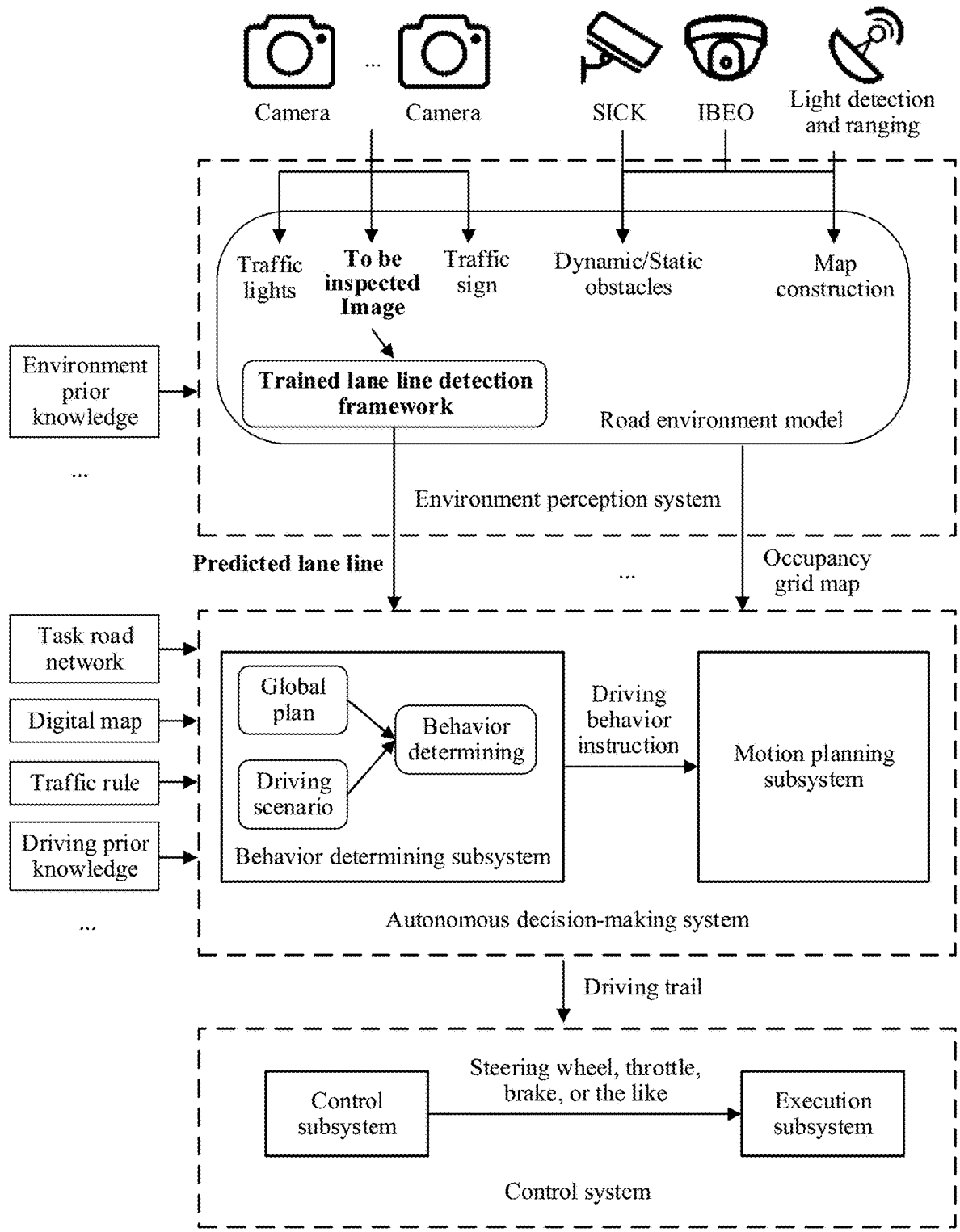
FIG. 10 is a schematic diagram of a deployment location of a trained lane line detection framework on an autonomous driving vehicle according to an embodiment of this disclosure.

It should be noted that, the trained lane line detection framework (or the detection device 210 shown in FIG. 9) constructed in this disclosure in FIG. 8 and FIG. 9 may be deployed in various wheeled mobile devices, and is configured to process perception information (for example, a video or an image) that is related to a road surface and that is photographed by a camera mounted on the wheeled mobile device, to output a predicted lane line. The predicted lane line is input to a downstream module of the wheeled mobile device for further processing. The following uses an example in which the wheeled mobile device is an autonomous driving vehicle to describe a deployment location of the trained lane line detection framework and an overall architecture of the autonomous driving vehicle. For details, refer to FIG. 10. FIG. 10 shows a top-down layered architecture. A defined interface may exist between systems to transmit data between the systems, to ensure real-time quality and integrity of the data. Various systems are a briefly introduced below.

(1) Environment Perception System

Environment perception is a most basic part of the autonomous driving vehicle. Making a driving behavior decision and planning a global path both need to be based on environment perception, and corresponding determining, decision, and planning are performed based on a real-time perception result of a road traffic environment, so that intelligent driving of the vehicle is implemented.

The environment perception system mainly obtains related environment information by using various sensors, to construct an environment model and express knowledge about a traffic scenario. A used sensor includes one or more cameras, a single-line radar (SICK), a four-line radar (IBEO), a three-dimensional laser radar (HDL-64E), and the like. A video or an image collected by the camera is mainly responsible for traffic light detection, lane line detection, road signpost detection, vehicle identification, and the like. Other laser radar sensors are responsible for detection, identification, and tracking of key dynamic/static obstacles, as well as detection and extraction of non-key obstacles such as roadside boundaries, shrubs, and surrounding buildings. In this embodiment of this disclosure, perceived data that is related to a road surface and that is photographed by a camera is used, that is, a to-be-detected image on the road surface. The to-be-detected image (which may be an image directly photographed by the camera, or may be an image extracted from a video photographed by the camera, where the to-be-detected image is not limited herein) is input to a trained lane line detection framework constructed in this embodiment of this disclosure. After the to-be-detected image is detected by the trained lane line detection framework, a prediction result (that is, a predicted lane line) for a real lane line in the to-be-detected image is output. The prediction result may be directly sent to a downstream module (for example, an autonomous decision-making system) of the autonomous driving vehicle for further processing, or may be input to another model (for example, a map construction model, which is not shown in FIG. 10) in the environment perception system, to be together with other perception information for construction to obtain an occupancy grid map (occupancy grid map, OGM) that can express a road environment. Finally, the OGM is sent to the autonomous decision-making system to further make a decision and a plan.

(2) Autonomous Decision-Making System

The autonomous decision-making system is a key component of the autonomous driving vehicle. The system is mainly divided into two core subsystems: a behavior determining subsystem and a motion planning subsystem. The behavior determining subsystem mainly obtains a global optimal traveling route by running a global planning layer, to make a specific driving task clear, then determines a proper driving behavior based on current real-time road information (for example, a predicted lane line) sent by the environment perception system and based on a road traffic rule and driving experience, and sends a driving behavior instruction to the motion planning subsystem. The motion planning subsystem plans a feasible driving trail based on the received driving behavior instruction and current local environment perception information, and based on indicators such as security and stability, and sends the feasible driving trail to a control system.

(3) Control System

Specifically, the control system is also divided into two parts: a control subsystem and an execution subsystem. The control subsystem is configured to convert the feasible driving trail generated by the autonomous decision-making system into a specific execution instruction for each execution module, and transfer the specific execution instruction to the execution subsystem. After receiving the execution instruction from the control subsystem, the execution subsystem sends the execution instruction to each control object, to properly control steering, braking, a throttle, a gear, and the like of the vehicle, so that the vehicle automatically travels to complete a corresponding driving operation.

It should be noted that, in a traveling process of the autonomous driving vehicle, accuracy of a driving operation of the autonomous driving vehicle mainly depends on whether the specific execution instruction generated by the control subsystem for each execution module is accurate, and whether the specific execution instruction is accurate depends on the autonomous decision-making system. The autonomous decision-making system faces uncertainty, and uncertain factors mainly include the following several aspects: (1) A feature and a calibration error that are of each sensor in the environment perception system bring uncertainty. Different sensors have different perception mechanisms, perception ranges, and corresponding error patterns, and calibration errors caused by installation of the sensors on the autonomous driving vehicle are finally reflected in uncertainty of perception information. (2) A delay in data processing of the environment perception system brings uncertainty, which is caused by the following reason: A road environment is complex and an amount of data information is large, and therefore a calculation amount in data processing of the environment perception system is also large. In addition, an entire environment is changing at any moment, which inevitably causes a delay in data information, affecting correct determining of the autonomous decision-making system. (3) Different manners of processing perception information also bring uncertainty. This embodiment of this disclosure is used as an example. If a conventional manual feature-based lane line detection method or a convolution feature-based lane line detection method shown in FIG. 5 is used, lane line detection precision is not high. The existing lane line detection manner cannot meet an increasingly rigorous application scenario of the autonomous driving vehicle. If lane line detection precision can be improved, uncertainty of the autonomous decision-making system can be correspondingly reduced, thereby improving accuracy of the specific execution instruction generated by the control subsystem for each execution module.

It should be further noted that the overall architecture of the autonomous driving vehicle shown in FIG. 10 is merely an example. In actual application, there may be more or fewer systems/subsystems or modules, and each system/subsystem or module may include a plurality of components. This is not specifically limited herein.

Figure 11:
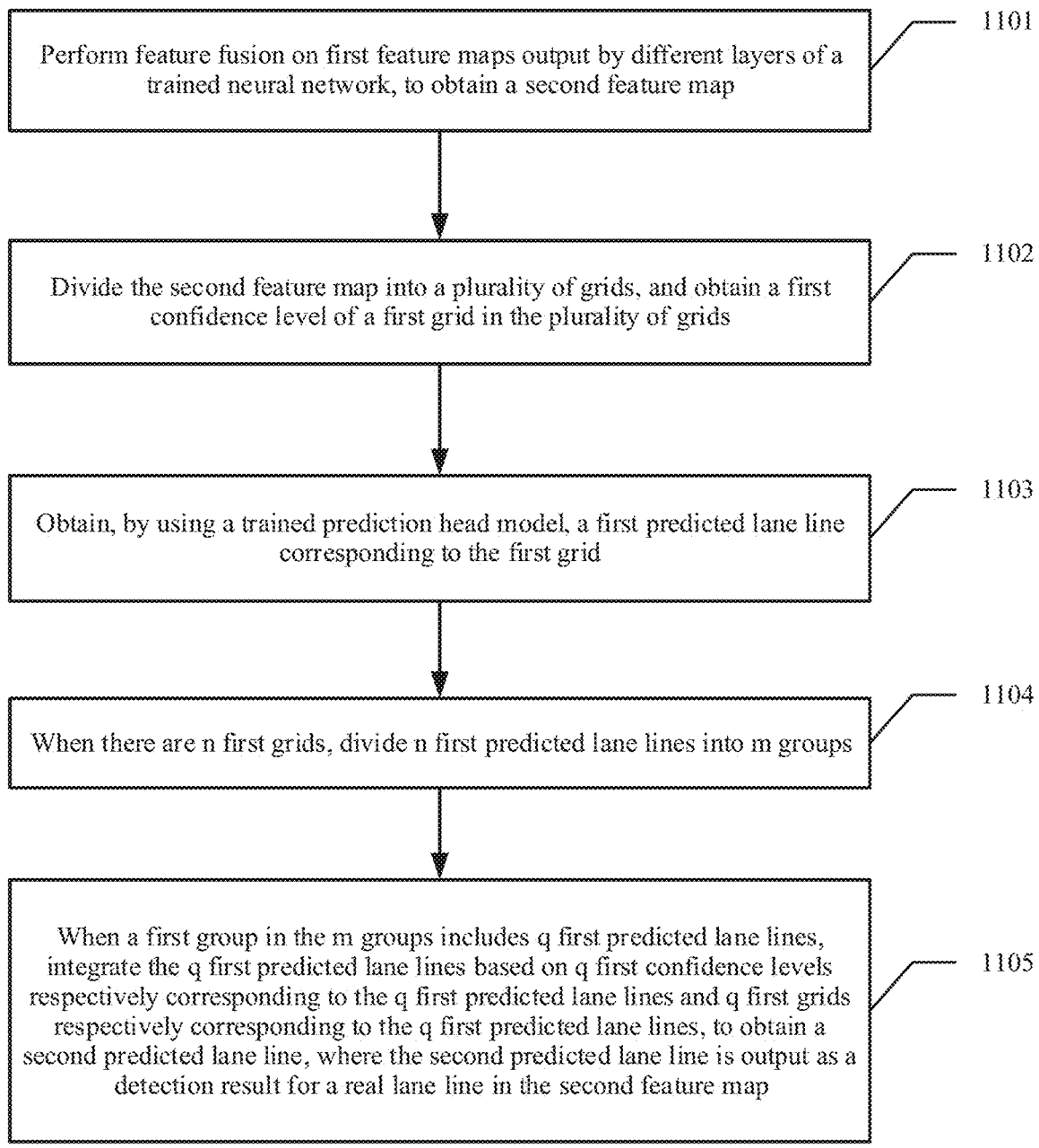
FIG. 11 is a schematic flowchart of a lane line detection method according to an embodiment of this disclosure.

The lane line detection method provided in embodiments of this disclosure may be performed based on the trained lane line detection frameworks shown in FIG. 8 and FIG. 9. In addition, the lane line detection method provided in embodiments of this disclosure may be applied to various scenarios in which motion planning (for example, speed planning, driving behavior determining, and global path planning) is performed for a wheeled mobile device in intelligent traveling (for example, unmanned driving or assistant driving). FIG. 11 is a schematic flowchart of a lane line detection method according to an embodiment of this disclosure, and the method specifically includes the following steps.

1101. Perform feature fusion on first feature maps output by different layers of a trained neural network, to obtain a second feature map.

A detection device on which the foregoing lane line detection framework is deployed first performs feature fusion on the first feature maps output by different layers of the trained neural network to obtain one or more second feature maps, where the one or more second feature maps are fused feature maps. This is because feature maps extracted by different layers of the neural network have different performance. A low-layer feature map has higher resolution and includes more location and detail information. However, the low-layer feature map undergoes less convolution, and therefore has lower semantics and more noise. A high-layer feature map has stronger semantic information, but has low resolution and a relatively low capability of perceiving a detail. Therefore, the second feature map obtained by performing feature fusion on the feature maps extracted by different layers of the neural network has features of a plurality of layers.

It should be noted that step 1101 may be obtained through calculation based on the trained feature fusion model 102 in the embodiment corresponding to FIG. 8. Specifically, based on the embodiment corresponding to FIG. 8, the trained neural network 101 first extracts a plurality of feature maps (that is, first feature maps) in different layers from a to-be-detected image, and then the trained feature fusion model 102 performs feature fusion to output one or more fused feature maps (that is, second feature maps).

It should be further noted that, in some implementations of this disclosure, the feature fusion model 102 may be selected, through searching, from a plurality of feature fusion models constructed in advance in this disclosure. Specifically, in this embodiment of this disclosure, a plurality of feature fusion models are first constructed according to a plurality of preset fusion rules, and each constructed feature fusion model corresponds to one fusion rule. One of the fusion rules is illustrated below. It is assumed that layers of the neural network are divided into x phases (for example, x is 4). Each phase includes one or more layers of the neural network, and a feature map extracted in the last layer in each phase is used as a first feature map. Different phases have different resolution, different quantities of channels, and different receptive fields. It is assumed that $F_{1,\ldots,t}$ represents first feature maps output by the neural network in different phases, and spatial resolution from a feature map $F_1$ to a feature map $F_t$ gradually decreases by a specific time (for example, two times). It is assumed that a to-be-constructed feature fusion model includes y fusion layers $\{O_i\}$, where a value of y is a hyperparameter, and the fusion layer is a fusion operation of performing feature fusion on a plurality of first feature maps. For each fusion layer, z (for example, two) first feature maps with relatively high resolution are selected from F as input, and one first feature map with relatively low resolution is further selected from $F_{1,\ldots,t}$ for comparison. The z first feature maps are first operated by at least one convolution kernel to output z third feature maps, and then resolution of the z third feature maps is processed (for example, a downsampling operation, a pooling operation, or a convolution operation, which is not limited herein), to obtain z fourth feature maps having same resolution as the selected first feature map with relatively low resolution. Then, the z fourth feature maps are fused again in a preset combination manner to obtain at least one second feature map. Code is correspondingly generated for different fusion rules based on a coding scheme set in advance. A detection device may identify a specific fusion rule based on the code, and then may know a specific feature fusion model.

For ease of understanding, one of the fusion rules and corresponding code are described below by using FIG. 12 as an example. It is assumed that first feature maps (the feature maps may also be referred to as feature layers) output by the neural network in different phases are separately denoted as "0", "1", and "2" shown in FIG. 12. The feature map "0" and the feature map "1" are two feature maps with relatively high resolution, and the feature map "2" is a feature map with relatively low resolution. First, a 1×1 convolution kernel operation is separately performed on the feature map "0" and the feature map "1" to obtain output with a same quantity of channels, and then the output is separately upsampled or downsampled to obtain a feature map having same resolution as the feature map "2". Three feature maps with same resolution are further stacked on specified resolution to form a plurality of fused feature maps (that is, fusion layers), and then the plurality of fusion layers are fused again to obtain a finally output feature map. The foregoing fusion rules may be coded as "012 to 022" according to a preset coding rule, and meanings represented by the numbers are shown in FIG. 13. A detection device may identify a corresponding fusion rule based on the code.

Figure 12:
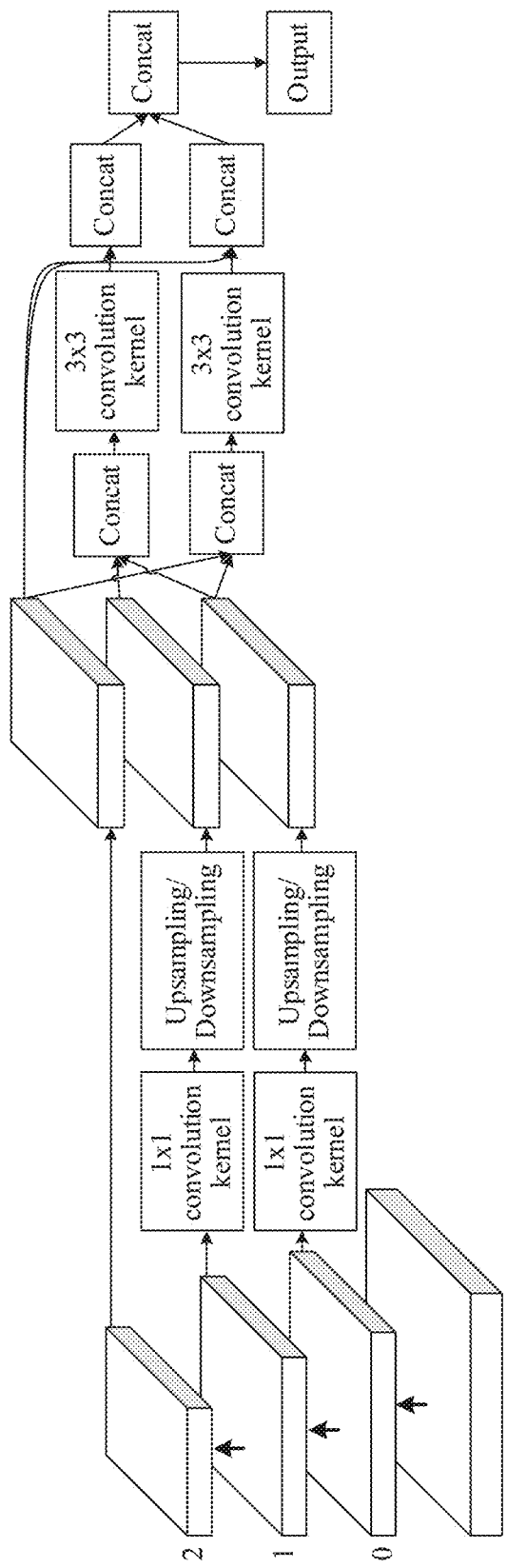
FIG. 12 is a schematic diagram of a preset fusion rule according to an embodiment of this disclosure.
Figure 13:
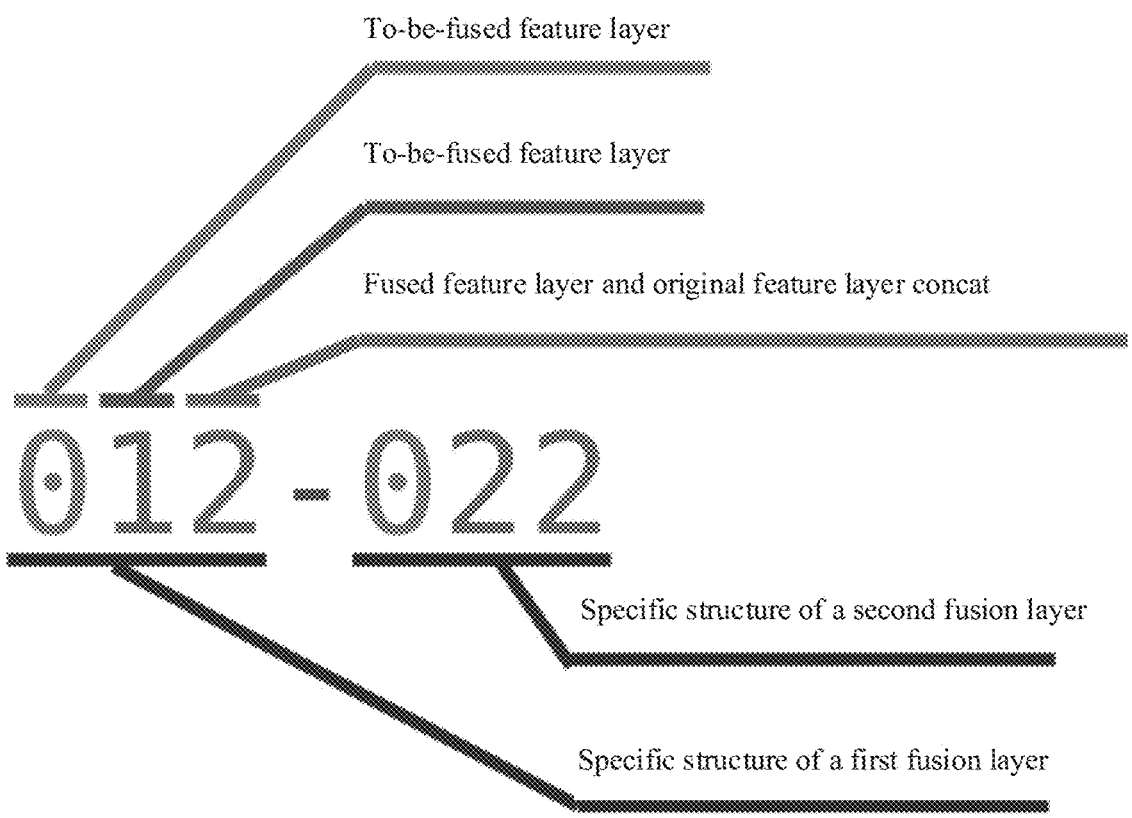
FIG. 13 is a schematic diagram of a coding rule according to an embodiment of this disclosure.

It should be noted that fusion of two feature maps related to the fusion rule shown in the embodiment corresponding to in FIG. 12 is illustrated in a "concat" manner. Actually, in some implementations of this disclosure, a specific fusion manner may be the foregoing "add" manner, which is not limited herein.

In this embodiment of this disclosure, both the neural network and the feature fusion model are determined after training, a plurality of network structures may be selected for the neural network, and a plurality of feature fusion models are also constructed in this embodiment of this disclosure. Therefore, how to select a neural network (which may be referred to as a target neural network) and a feature fusion model (which may be referred to as a target feature fusion model) from the plurality of neural networks and the plurality of feature fusion models is extremely important. In some implementations of this disclosure, the neural network and the feature fusion model may be obtained in but unnecessarily in the following manners.

(1) A combination of "neural network+feature fusion model" is obtained through searching in search space formed by a plurality of existing neural networks and a plurality of feature fusion models constructed in this disclosure.

Lane line detection is special target detection. Therefore, many existing neural networks used for target detection, such as a residual network (ResNet, ResNeXt, or the like), a faster region-convolutional neural network (Faster R-CNN), and a single shot multibox defender (SSD), may be applied to lane line detection after some network structure adjustment. However, performance shown by different network structures is different in a specific lane line detection task. Similarly, although a plurality of feature fusion models are constructed in this embodiment of this disclosure by using a plurality of preset fusion rules, feature fusion models having different fusion rules also show different performance in a specific type of lane line detection task or a specific lane line detection task. Based on this, in this disclosure, through analysis, experiment, and evaluation on many lane line detection models, it is determined that a combination architecture "neural network+feature fusion model" is a basic model structure suitable for a lane line detection task. The combination architecture may be referred to as a lane line detection network. Then, the lane line detection network formed by "neural network+feature fusion model" is coded, and code corresponding to all lane line detection networks formed by "neural network+feature fusion model" form search space. A corresponding search rule (for example, random sampling) is set to search the search space to obtain a target "neural network+feature fusion model", that is, a target lane line detection network, that meets a requirement in this embodiment of this disclosure.

Specifically, first, search space for "neural network+feature fusion model" is constructed, that is, a code combination corresponding to each pair of "neural network+feature fusion model". Each search process includes performing sampling in the search space. After sampling, a character string (that is, a code combination) representing "neural network+feature fusion model" may be obtained, and a specific instance for "neural network+feature fusion model", that is, a specific structure of a lane line detection network, is generated based on the character string. Then, the instance is trained by using training data in a training set to obtain a trained lane line detection network, and performance evaluation is performed on the trained lane line detection network after the training is completed, to obtain network performance. Similarly, the foregoing operation is performed for each sampling point to obtain performance of a lane line detection network corresponding to the sampling point. When a quantity of sampling times reaches a preset quantity of times, for example, 400 times, correspondingly obtained lane line detection networks also have 400 types of network structures, and performance of the 400 lane line detection networks is also obtained through performance evaluation. Afterwards, a lane line detection network is selected from the 400 lane line detection networks as a final target lane line detection network based on a preset condition that is set in advance in this disclosure, where the target lane line detection network includes a corresponding target neural network (such as the trained neural network 101) and a corresponding target feature fusion model (such as the trained feature fusion model 102). Finally, a feature may be extracted from a to-be-detected image by using the target neural network in the target lane line detection network to obtain first feature maps output by different layers of the target neural network. The first feature maps output by different layers are further used as input of the target feature fusion model, and the target feature fusion model outputs the second feature map.

It should be noted that, in some implementations of this disclosure, a manner of selecting a lane line detection network from a plurality of sampled lane line detection networks as a final target lane line detection network based on a preset condition that is set in advance in this disclosure may specifically include but is not limited to the following manners: (1) A lane line detection network whose performance is optimal in performance of lane line detection networks corresponding to all sampling points is selected as the target lane line detection network. (2) A lane line detection network whose computing power is the largest in computing power of the lane line detection networks corresponding to all the sampling points is selected as the target lane line detection network.

Figure 14A:
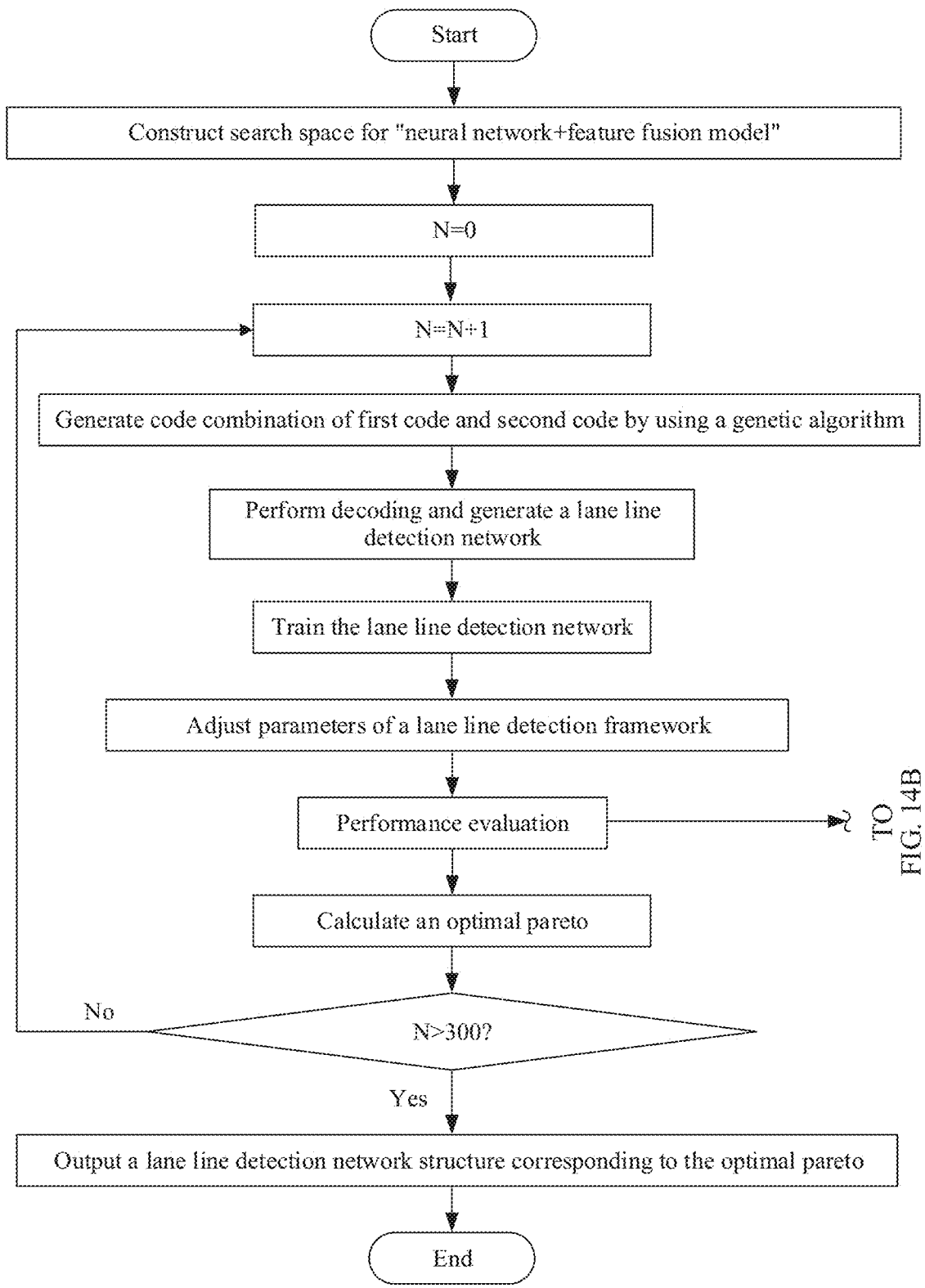
FIG. 14A and FIG. 14B are a schematic diagram of obtaining a target lane line detection network through searching according to an embodiment of this disclosure.
Figure 14B:
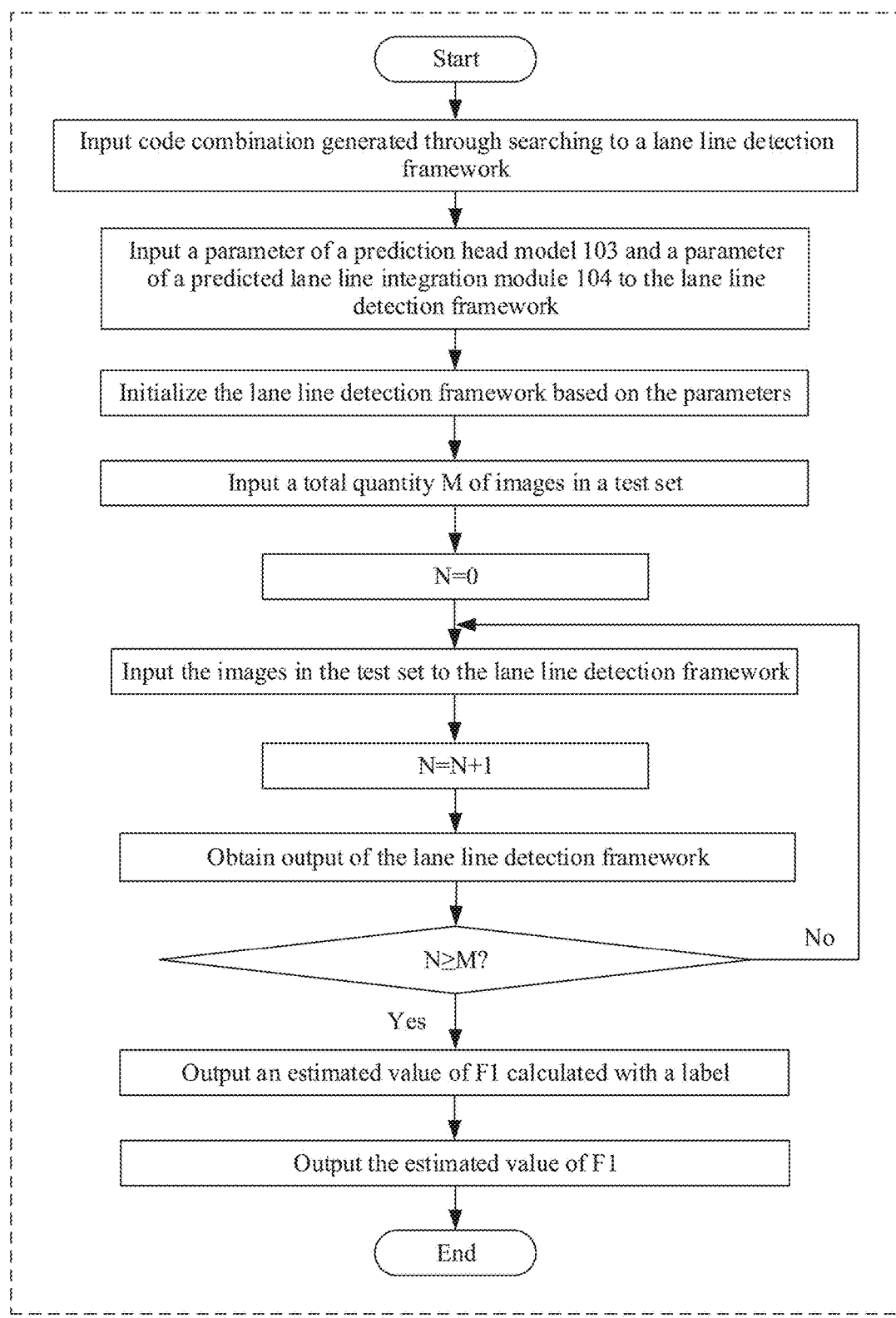

For ease of understanding, the foregoing process is described below in detail by using a specific example. For details, refer to FIG. 14A and FIG. 14B. FIG. 14A and FIG. 14B are a manner of obtaining a target lane line detection network through searching according to an embodiment of this disclosure. First, search space for "neural network+feature fusion model" is constructed, that is, a code combination corresponding to each pair of "neural network+feature fusion model". Each search process includes performing sampling in the search space. After sampling, a character string, that is, a code combination, that represents "neural network+feature fusion model" may be obtained. The code combination is formed by combining first code of a sampled neural network and second code of a sampled feature fusion model, and a specific instance for "neural network+feature fusion model" (that is, a specific structure of a lane line detection network) is obtained based on the character string. A quantity of sampling times shown in FIG. 14A and FIG. 14B is N=300, where N is a preset quantity of sampling times. In each time of sampling, the code combination formed by the first code of the neural network and the second code of the feature fusion model is generated based on a genetic algorithm (such as random generation), and then the code combination is decoded to generate a lane line detection network. Further, the lane line detection network obtained in each time of sampling is trained by using training data in a training set, output (that is, an obtained fused feature map) of the lane line detection network is further input to the prediction head model 103 and the predicted lane line integration module 104 shown in FIG. 8, and the entire lane line detection framework is trained. Finally, performance of the lane line detection network is evaluated based on a predicted lane line. A specific evaluation manner may include but is not limited to the following manner. Each code combination generated through searching is input to the lane line detection framework shown in FIG. 8, a parameter of the prediction head model 103 and a parameter of the predicted lane line integration module 104 are input, and the lane line detection framework is initialized based on all the parameters. Then, a total of M images in a test set are sequentially input to obtain output of the lane line detection framework. Specifically, for each image in the test set, a fused feature map that is output from the feature fusion model 102 in the lane line detection network is first obtained, and then an integrated predicted lane line is output from the predicted lane line integration module 104 based on the fused feature map. Further, F1 is estimated based on the output predicted lane line and a label, to output an estimated value of F1. The estimated value of F1 is used as an indicator of performance of the lane line detection network. Finally, parameters (such as the prediction head model 103 and the predicted lane line integration module 104) of the entire lane line detection framework are adjusted based on evaluation results for performance of lane line detection networks. After enough sampling points are accumulated, a scatter graph formed by delays represented by the sampling points and the estimated value of F1 is drawn. A point at the Pareto front of the scatter graph is selected, then operations (basic operations in the genetic algorithm) such as dropout and random exchange are performed based on the point, and a point obtained through the operation is used as a new sampling point. After a total quantity of sampling times reaches a preset value (such as 300), a pareto optimality point is output as a finial search result, that is, a finally output lane line detection network.

Figure 15:
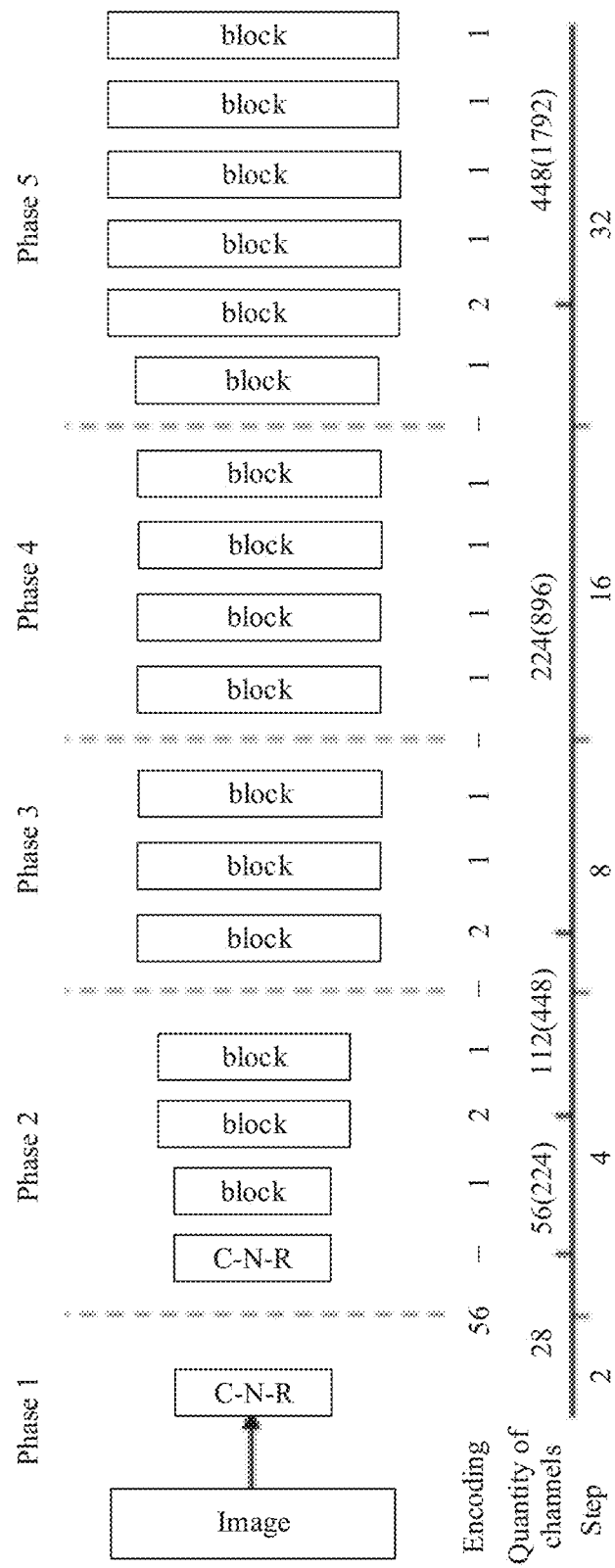
FIG. 15 is a schematic diagram of dividing basic blocks of a neural network into five phases according to an embodiment of this disclosure.

It should be noted herein that, in the implementation corresponding to FIG. 14A and FIG. 14B, a neural network is constructed by stacked basic blocks of ResNet/ResNeXt. Because the ResNet/ResNeXt has many blocks (for example, 10 to 45 blocks), the blocks of the ResNet/ResNeXt may be divided into a plurality of phases herein based on a requirement, and the last blocks in different phases output first feature maps. FIG. 15 shows that all blocks are divided into five phases, which are respectively a phase 1 to a phase 5. Quantities of channels are respectively 48, 64, 80, 96, and 128, and the phases may choose to include different quantities of blocks. Based on this, it may be learned that if quantities of blocks in a neural network are different and phase division manners are different, the constructed neural network also has many types of network structures. In addition, to flexibly allocate a calculation amount, a location at which a quantity of channels increases is obtained through searching. A quantity of blocks included in each neural network, a quantity of phases obtained through division, a quantity of blocks specifically included in each phase, a location of a quantity of channels, and the like all can be coded by using a preset rule (that is, the first code shown in FIG. 14A and FIG. 14B). Each piece of first code corresponds to one neural network.

Figure 16A:
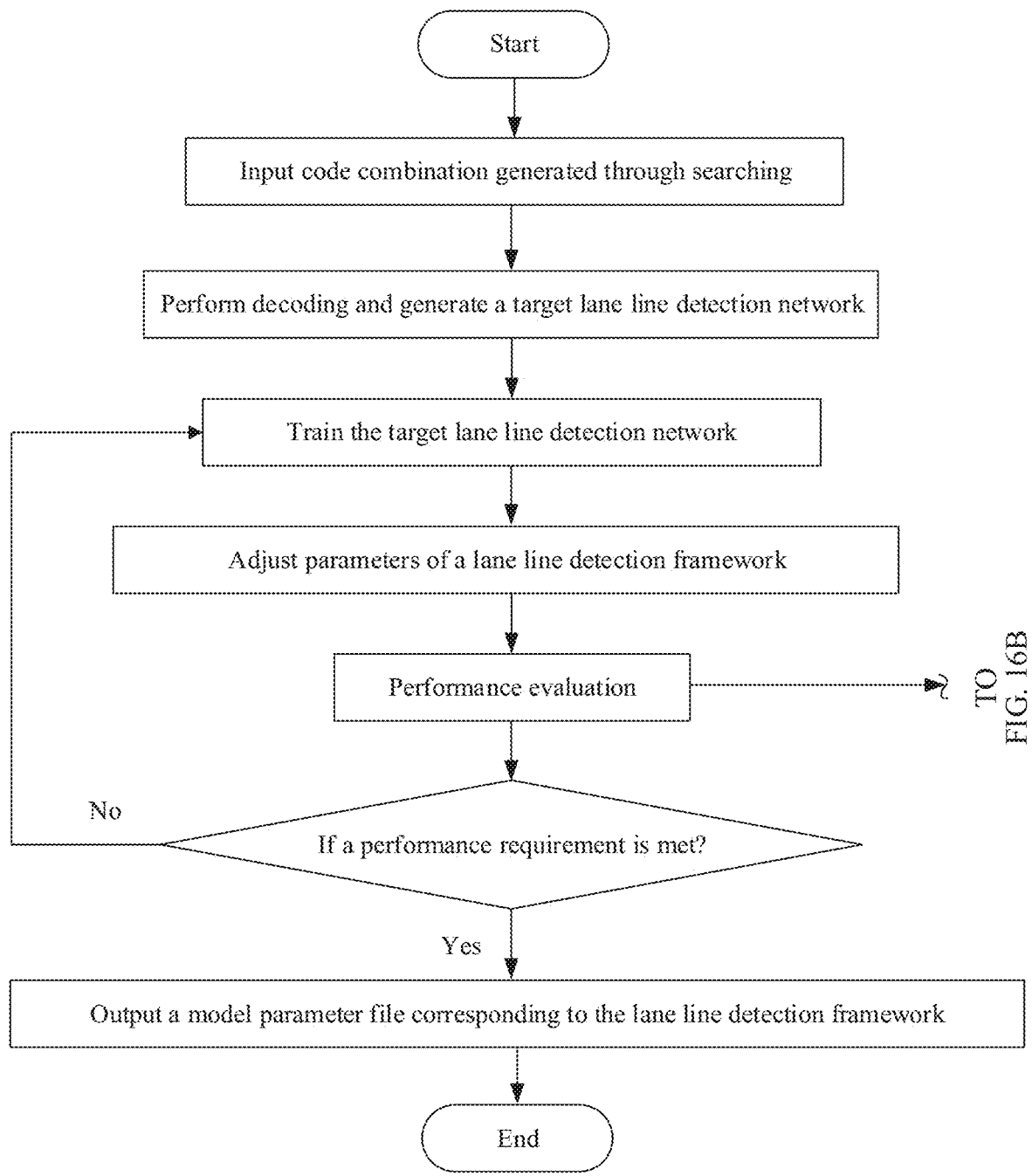
FIG. 16A and FIG. 16B are a schematic diagram of fully training according to an embodiment of this disclosure.
Figure 16B:
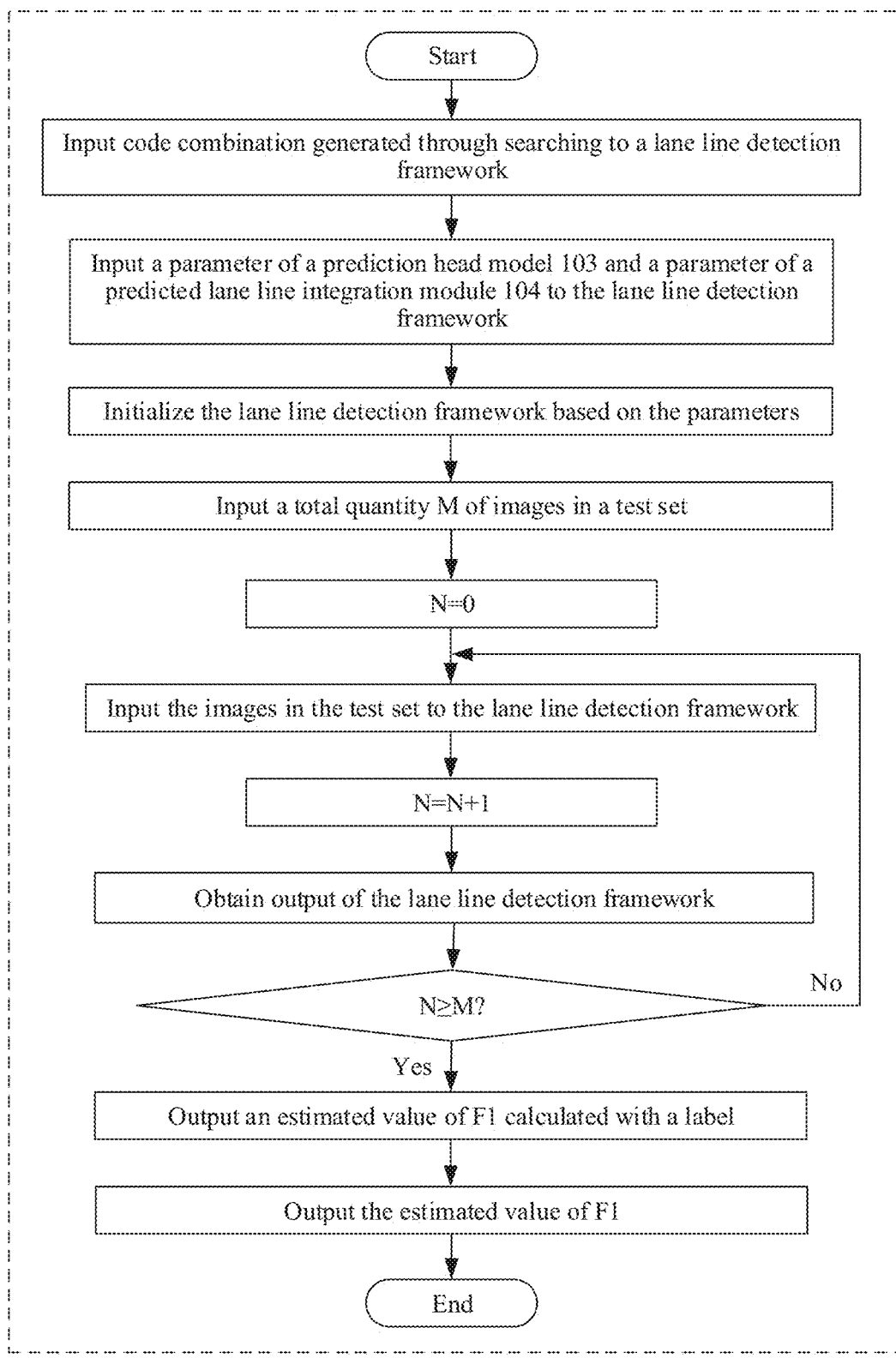

It should be further noted that, in embodiments corresponding to FIG. 14A, FIG. 14B, and FIG. 15, for each lane line detection network obtained through searching, performance of the lane line detection network obtained through searching may be evaluated by using training data in a fully training set. However, there are approximately $5 \times 10^{12}$ cases for total search space formed by neural networks. After each time of sampling, a value (that is, training) needs to be assigned to a parameter in each initialized lane line detection network. Only a completely trained lane line detection network can represent precision of a found neural network (precision of a model that is not completely trained drifts severely), and it is excessively time-consumed to perform complete training on the fully training set. Therefore, in some implementations of this disclosure, sampling is performed in the fully training set, and then complete training is performed on a representative sample. For example, in embodiments corresponding to FIG. 14A, FIG. 14B, and FIG. 15, a training set obtained through image sampling may include 100,000 images and a test set includes 30,000 images. Specifically, sampling is first performed in search space formed by a plurality of neural networks and a plurality of feature fusion models. After sampling, each found lane line detection network is trained by using the 100,000 samples in the training set. After the training is completed, performance evaluation is performed by using the 30,000 samples in the test set, and the parameters of the entire lane line detection framework are adjusted based on an evaluation result. Based on this, after a target lane line detection network is obtained through searching, fully training (fully train) needs to be further performed on the target lane line detection network. A main purpose of setting the fully training is to train a lane line detection framework that can be deployed on a device. In a fully training procedure, a fully training set is used to perform training and perform performance evaluation in this embodiment of this disclosure. A specific method may be shown in FIG. 16A and FIG. 16B. A code combination of a found target "neural network+feature fusion model" is decoded to obtain the target lane line detection network, and the target lane line detection network is trained. After the training ends, performance evaluation is performed, and a collective parameter of an entire lane line detection framework of a vehicle is adjusted based on a performance evaluation result. If a final performance evaluation result meets a performance requirement, a corresponding file of the lane line detection framework is output for deployment. A specific process of training the lane line detection network is similar to a training procedure in a search process, and details are not described herein again.

In conclusion, the target "neural network+feature fusion model" obtained in the search process is used to ensure that search time can be borne by a person. Therefore, a policy of performing sampling in a training set is used, and a subset of the training set is used during searching and evaluation. The fully training procedure is to train the found target "neural network+feature fusion model" by using the fully training set (for example, one million images). After the training is completed, the parameters of the lane line detection framework are fine adjusted based on the evaluation result. A purpose of setting the processes is to train a lane line detection framework that can be deployed on a device.

(2) First search space formed by a plurality of existing neural networks is searched for a neural network, and then second search space formed by a plurality of feature fusion models constructed in this disclosure is searched for a feature fusion model.

In this manner, searching, training, performance evaluation, and the like are separately performed in the first search space formed by the plurality of existing neural networks and the second search space formed by the plurality of feature fusion models constructed in this disclosure. A process of searching the first search space for a neural network and performing training and performance evaluation on each found neural network, and a process of searching the second search space for a feature fusion model and performing training and performance evaluation on each found feature fusion model both are similar to a manner that is in the foregoing manner (1) and in which jointly combined search space is searched for a combination architecture "neural network+feature fusion model". Details are not described herein again. For details, refer to the process in the foregoing manner (1). Different from the manner (1), in the manner (2), searching, training, and performance evaluation are separately performed on the two modules, and then a trained target neural network and a trained target feature fusion model are combined to form a required target lane line detection network.

1102. Divide the second feature map into a plurality of grids, and obtain a first confidence level of a first grid in the plurality of grids.

Based on the description in step 1001, at least one second feature map may be obtained. Each obtained second feature map may be divided into a plurality of grids. If a grid whose confidence level has a value greater than a preset threshold (for example, the preset threshold is 0.6) exists in the plurality of grids, the confidence level greater than the preset threshold may be referred to as a first confidence level, and a grid corresponding to the first confidence level may be referred to as a first grid.

Figure 17:
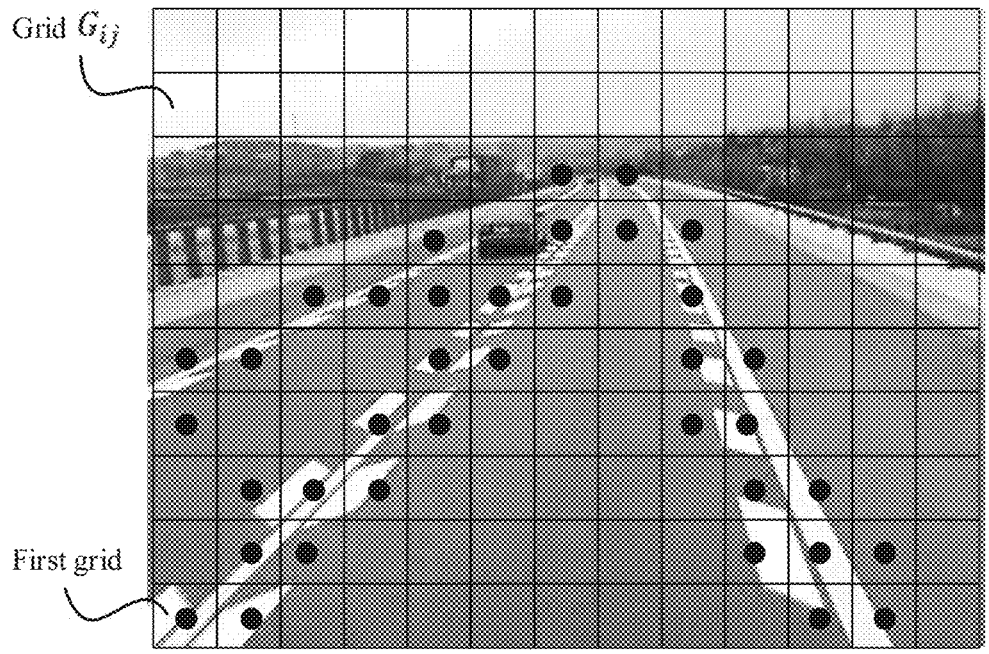
FIG. 17 is a schematic diagram of dividing a to-be-detected image into a plurality of grids and determining a first grid from the plurality of grids according to an embodiment of this disclosure.

It should be noted herein that, a purpose of selecting, from the plurality of grids, the grid corresponding to the first confidence level is to remove redundant grids that do not contribute to prediction for a lane line, to reduce a calculation amount. Because a lane line is distributed in a to-be-detected image in a thin and long type, as shown in FIG. 17, the second feature map that is output by the lane line detection network is divided into a plurality of grids with a size of w×h. One of the grids may be denoted as $\{G_{ij}\}$, and a central point of each grid $G_{ij}$ on the second feature map is referred to as an anchor point. If the central point of $G_{ij}$ is close to a real lane line on the ground, the $G_{ij}$ is responsible for detecting the lane line. Because a real lane line may span a plurality of grids, one lane line may correspond to a plurality of grids. A confidence level $S_{ij}$ of the grid $G_{ij}$ reflects a probability that a lane line passes through the grid $G_{ij}$. In a training phase, each real lane line in a training image is marked. Therefore, there are only two cases for the probability that a lane line passes through the grid $G_{ij}$: If the lane line passes through the grid, a value of the confidence level $S_{ij}$ of the grid $G_{ij}$ is 1; or if the lane line does not pass through the grid, a value of the confidence level $S_{ij}$ of the grid $G_{ij}$ is 0. In a detection phase, whether a lane line exists on the extracted second feature map and that a lane line exists at a specific location exist in a form of a probability. Therefore, the probability that a lane line passes through the grid $G_{ij}$ is a probability that a lane line exists at a location of the grid. In the to-be-detected image in the detection phase, three lane lines really exist. Only those grids (that is, grids marked with black dots in FIG. 17) distributed near the lane lines have significance for prediction for a lane line. Therefore, these grids marked with black dots are referred to as first grids.

It should be noted that, for a to-be-detected image, a value of a confidence level corresponding to each grid is obtained in an existing manner. Details are not described herein. However, it should be noted that an initial confidence level (a roughly estimated value) of each grid is obtained in this manner. In some implementations of this disclosure, a grid corresponding to an initial confidence level in these initial confidence levels that has a value greater than a threshold may be selected as the first grid, and a confidence level of the first grid is used as the first confidence level for subsequently predicting a lane line.

It should be further noted that, because the initial confidence level is a roughly estimated value, prediction is not high in a process of using the initial confidence level to predict a lane line. Therefore, in some other implementations of this disclosure, the initial confidence level of the first grid may be first obtained, and then the initial confidence level of each first grid is adjusted in a preset manner, to obtain the first confidence level of the first grid. A purpose of the adjustment is to make prediction for a remote end of a lane line more accurate in the prediction process. The first confidence level may be specifically obtained in but unnecessarily in the following manners.

(1) The first confidence level is obtained based on a statistical method by using the initial confidence level.

Figure 18:
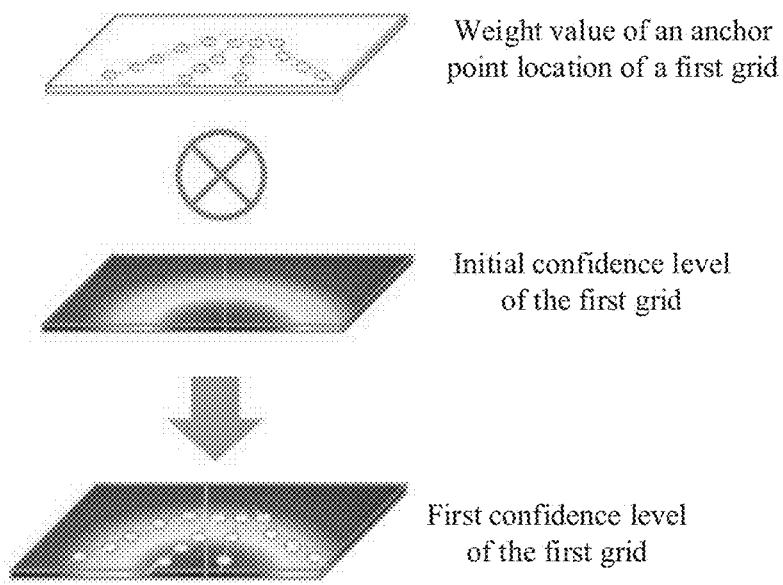
FIG. 18 is a schematic diagram of calculating a first confidence level by using an initial confidence level according to an embodiment of this disclosure.

First, a statistical model is established based on distribution of anchor point locations of grids in which remote ends of real lane lines in images in a training set are located, where the statistical model has at least one to-be-determined parameter. Then, the parameter in the statistical model is estimated based on a statistical result for the anchor point locations of the grids in which the remote ends of the real lane lines in the images in the training set are located, to obtain an estimated value of the parameter, and the estimated value of the parameter is adjusted in the foregoing process of training a lane line detection network (for example, training and fully training in the search process), to obtain a final determinate value of the parameter in the statistical model. Further, an anchor point location of the first grid is calculated by using the statistical model for which the determinate value of the parameter is determined, to obtain a weight value of the anchor point location of the first grid. Finally, an operation is performed on the initial confidence level of the first grid and the weight value to obtain the first confidence level of the first grid. As shown in FIG. 18, a product operation is performed on the initial confidence level of each first grid and a weight value of the anchor point location of each first grid, to obtain the first confidence level of the first grid.

Figure 19:
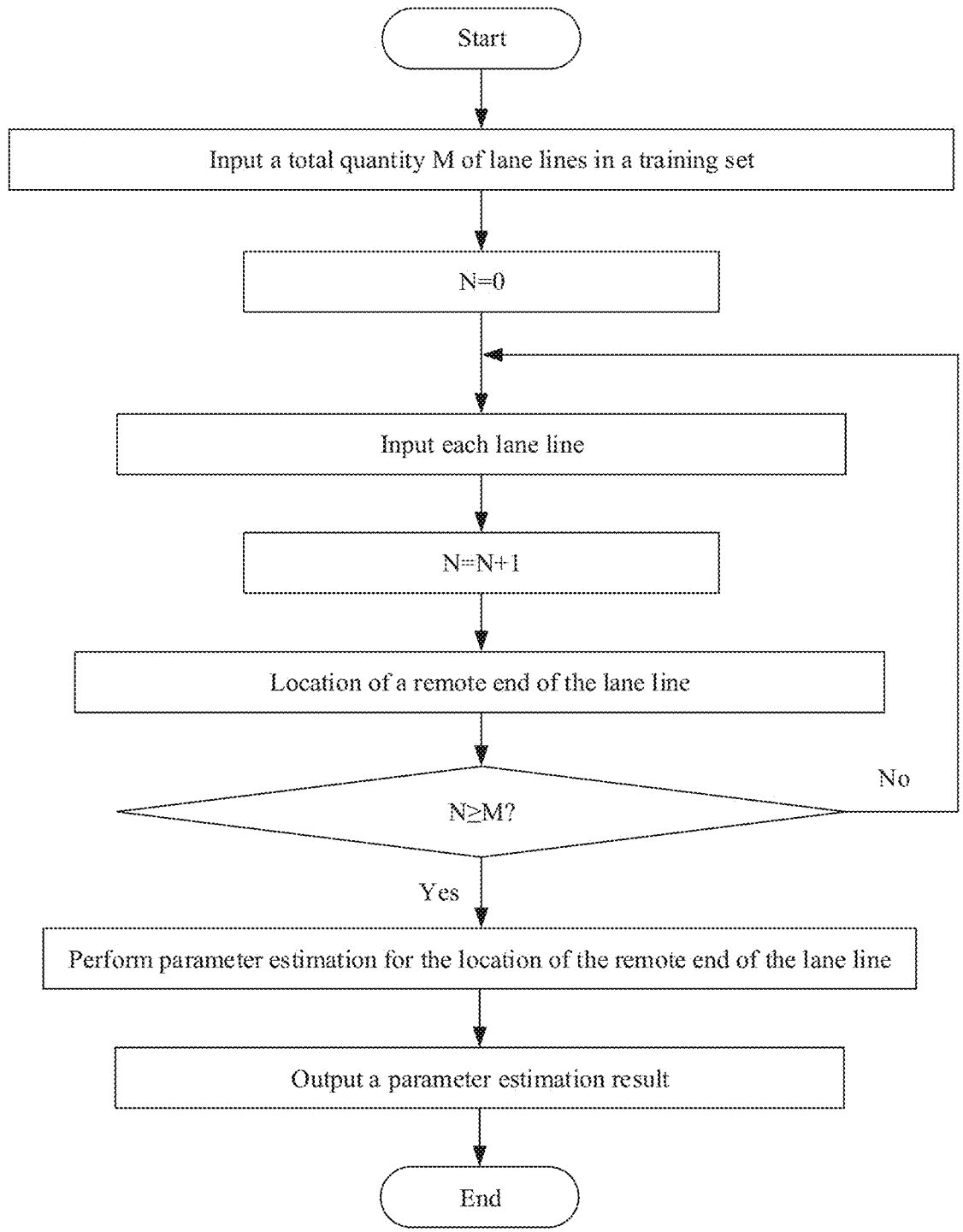
FIG. 19 is a schematic diagram of obtaining a first confidence level based on a statistical method by using an initial confidence level according to an embodiment of this disclosure.
Figure 20:
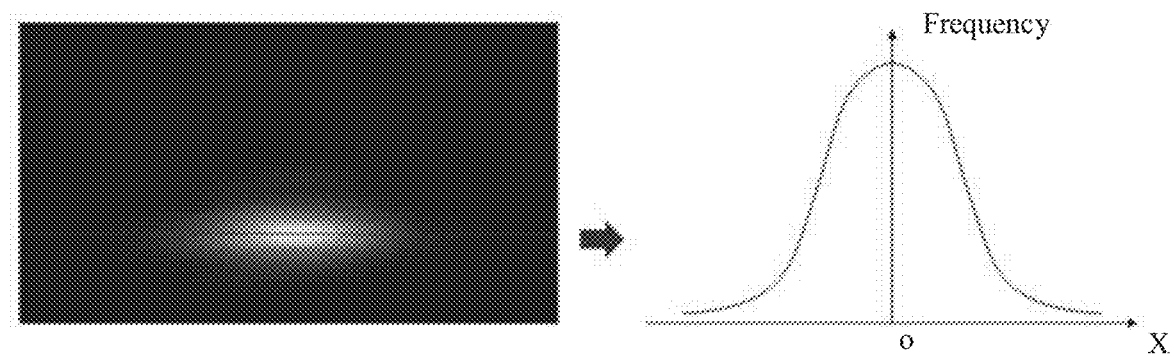
FIG. 20 is a schematic diagram of a frequency heatmap for central points of grids in which remote ends of lane lines are located and a Gaussian function according to an embodiment of this disclosure.

For ease of understanding, the foregoing statistical method is illustrated below. For details, refer to FIG. 19. First, statistics about distribution that is of anchor points of grids corresponding to remote ends of all lane lines in the training set and that is on a feature map are collected (that is, it is assumed that locations of remote ends of lane lines in all training images in the training set are concentrated on a graph, and statistics about distribution of the locations of the remote ends of all the lane lines are collected, and it is assumed that a total quantity of lane lines is M in FIG. 19). Then, the distribution is modeled, estimation of a parameter in a distribution model is obtained based on a statistical result for the remote ends of all the lane lines in the training set, and a parameter estimation result is output. Specifically, first, statistics about locations of the anchor points of the grids corresponding to the remote ends of the lane lines in the training set are collected, to obtain a frequency heatmap for all the anchor points, as shown in a left part of FIG. 20. A horizontal central cross-section of the frequency heatmap approximates to a Gaussian function shown in a right part of FIG. 20. Therefore, in some implementations of this disclosure, the foregoing statistical model may be modeled as a Gaussian function in Formula (1):

$$f(X) = \frac{1}{(2\pi)^{2/2}(a_1^2 a_2^2)^{1/2}} \exp\left(-\frac{1}{2}\left[\left(\frac{x_1-a_3}{a_1}\right)^2 + \left(\frac{x_2-a_4}{a_2}\right)^2\right]\right) \quad \text{(Formula 1)}$$

where $\alpha_1$ to $\alpha_4$ are four parameters in the statistical model, and X is coordinates of an anchor point location of a grid in which a remote end of a lane line is located.

After it is determined that the statistical model is the Gaussian function, statistics are collected based on coordinates of the anchor point locations of the grids in which the remote ends of the lane lines in the training set are located, to estimate a parameter value of the Gaussian function, which is used as an initialized parameter in the confidence level adjustment model 105 in the lane line detection framework in FIG. 8. In step 1101, in a process of performing searching and fully training on a lane line detection network formed by "neural network+feature fusion model", a parameter in a statistical model included in the confidence level adjustment model 105 needs to be adjusted, and a weight value occupied by an anchor point location of each first grid is further calculated according to Formula (1) in which a parameter value is adjusted. In this step, because the parameter of the Gaussian function is determined, X represents coordinates $X_n = \{x_1, x_2\}$ of the anchor point location of each first grid, and a product of $f(X_n)$ and the initial confidence level of each first grid is calculated to be used as a new confidence level (that is, the first confidence level).

(2) The first confidence level is obtained based on a learning method by using the initial confidence level.

In the manner (1), modeling is performed based on a statistical result for distribution of remote ends of lane lines in a large quantity of training sets. In the manner (2), the first confidence level of the first grid may be obtained through learning by using the initial confidence level of the first grid. Specifically, a neural network such as a convolutional neural network (CNN) may be constructed. The initial confidence level of the first grid in each training image in the training set is used as input of the CNN, to output the first confidence level of the first grid. A proper loss function is constructed, so that a trained CNN can output the first confidence level that is of the first grid and that meets a requirement in this disclosure.

1103. Obtain, by using a trained prediction head model, a first predicted lane line corresponding to the first grid.

After the first confidence level of each first grid is obtained, a predicted lane line (that is, a first predicted lane line) corresponding to each first grid may be further obtained by using the trained prediction head model (such as the prediction head model 103 in the lane line detection framework in FIG. 8). Specifically, in this embodiment of this disclosure, the first predicted lane line is obtained based on the first grid by using the prediction head model, and a specific working principle of the prediction head model is described in the embodiment corresponding to FIG. 6. Details are not described herein again.

Figure 21:
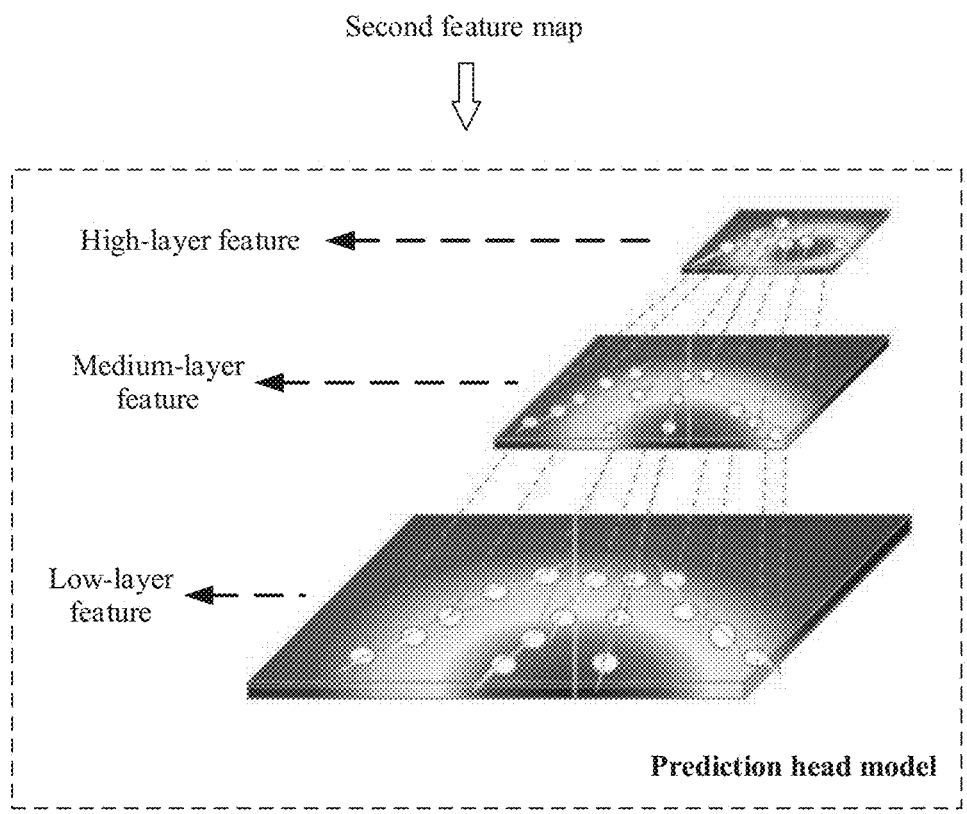
FIG. 21 is a schematic diagram of different layers of features of a first predicted lane line obtained by using a trained prediction head model according to an embodiment of this disclosure.

However, it should be noted that, the first grid input to the prediction head model is obtained through division based on the fused second feature map, and the second feature map has a plurality of layers of features. A low-layer feature on the second feature map has higher resolution, and includes more location and detail information. However, the low-layer feature undergoes less convolution, and therefore has lower semantics and more noise. A high-layer feature on the second feature map has stronger semantic information, but has low resolution and a poor capability of perceiving a detail. Therefore, as shown in FIG. 21, the first predicted lane line obtained by using the trained prediction head model also has different layers of features. A low-layer receptive field facilitates accurate regression of a lane line, and a high-layer receptive field helps determine whether a lane line exists.

1104. When there are n first grids, divide n first predicted lane lines into m groups.

A real lane line usually causes responses of a plurality of grids, and therefore many prediction results correspond to a real lane line in a prediction phase. After n first predicted lane lines corresponding to n first grids are obtained based on the prediction head model, the n first predicted lane lines obtained through prediction need to be divided into m groups, where each group includes at least one predicted lane line.

1105. When a first group in the m groups includes q first predicted lane lines, integrate the q first predicted lane lines based on q first confidence levels respectively corresponding to the q first predicted lane lines and q first grids respectively corresponding to the q first predicted lane lines, to obtain a second predicted lane line, where the second predicted lane line is output as a detection result for a real lane line in the second feature map.

If a specific group in the m groups includes q first predicted lane lines, the q first predicted lane lines are integrated based on q first confidence levels respectively corresponding to the q first predicted lane lines and q first grids respectively corresponding to the q first predicted lane lines, to obtain a second predicted lane line, where the second predicted lane line is output as a detection result for a real lane line in the second feature map.

Figure 22:
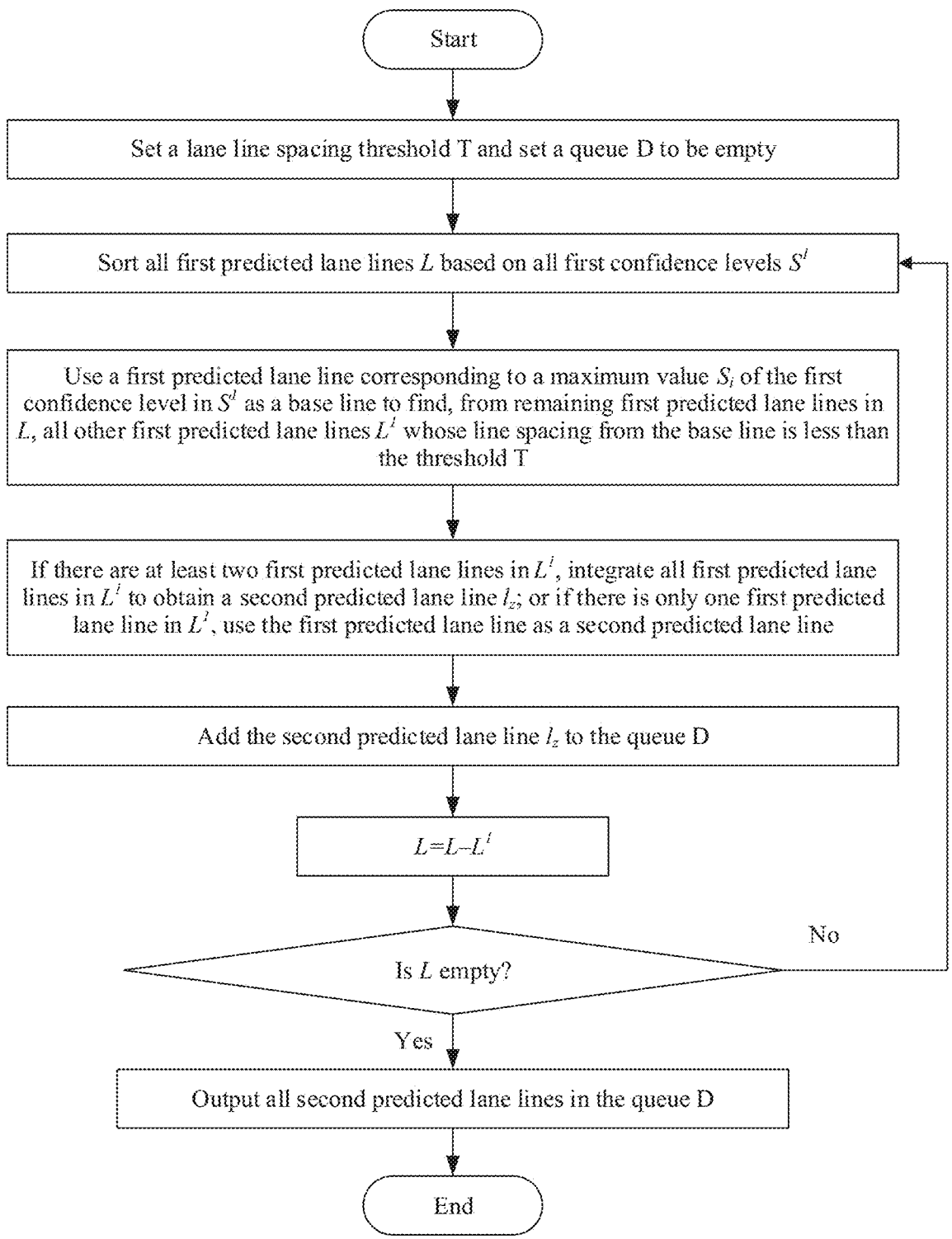
FIG. 22 is a flowchart of obtaining a second predicted lane line according to an embodiment of this disclosure.

For ease of understanding, how to divide n first predicted lane lines into m groups and obtain a final detection result is described below by using FIG. 22 as an example. Refer to FIG. 22. First, a lane line spacing threshold T is set, and a queue D is set to be empty. Then, n first predicted lane lines (the n first predicted lane lines may be denoted as L= $\{l_1, l_2, \ldots, l_n\}$) are sorted based on obtained n first confidence levels (the n first confidence levels may be denoted as $S^1 = \{s_1, s_2, \ldots, s_n\}$). A first predicted lane line corresponding to a maximum value $s_i$ of the first confidence level in $S^1$ is used as a base line to find, from the remaining (n−1) first predicted lane lines, all other first predicted lane lines whose line spacing from the base line is less than the threshold T, and the found other first predicted lane lines and the base line form a group of first predicted lane lines $L^1$ (it is assumed that this is the first group). The first group is used to predict a real lane line. Assuming that a prediction result obtained for this group of first predicted lane lines is a second predicted lane line $l_z$, the second predicted lane line $l_z$ is added to the queue D. In addition, all lane lines $L^1$ in the first group are removed from L=$\{l_1, l_2, \ldots, l_n\}$. Next, it is further determined whether L in the first group is empty. If L is not empty, a first predicted lane line corresponding to another maximum value $s_j$ of the first confidence level in $S^1$ continues to be selected from a first predicted lane line remaining in L as a base line, until all m groups are found based on to the foregoing similar steps, and a second predicted lane line is predicted for each group. If L is empty, it indicates that a current group is the $m^{th}$ group. In this case, m second predicted lane lines are obtained through prediction, all the m second predicted lane lines are input to the queue D in the foregoing manner, and it is only required to output the m second predicted lane lines as a final prediction result.

It should be noted that in this embodiment of this disclosure, any of the m groups need to include at least one first predicted lane line. If one or more of the m groups include more than two first predicted lane lines, the first predicted lane lines in the group need to be integrated to obtain one second predicted lane line. Herein, descriptions are separately provided based on different quantities of first predicted lane lines in each group.

(1) A first group in the m groups includes only one first predicted lane line.

When the first group in the m groups includes only one first predicted lane line, the first predicted lane line in the first group is directly output as a detection result for a real lane line in the second feature map.

(2) A first group in the m groups includes q first predicted lane lines, and q≥2.

If the first group in the m groups includes q first predicted lane lines (q≥2), a region occupied by the q first predicted lane lines in the second feature map may be divided into a plurality of sub-regions, where each sub-region includes an anchor point location of at least one of q first grids. If a first sub-region in the plurality of sub-regions includes anchor point locations of at least two first grids, processing may be performed in but unnecessarily in the following manners.

In a processing manner 1, a first grid is selected from the at least two first grids as a second grid based on first confidence levels respectively corresponding to the at least two first grids. For example, a first grid whose first confidence level has a maximum value is selected from the at least two first grids as the second grid, and a part that is of a first predicted lane line corresponding to the second grid and that is located in the first sub-region is used as a first part of the second predicted lane line. If a second sub-region in the plurality of sub-regions includes an anchor point location of only one first grid, a part that is of a first predicted lane line corresponding to the first grid included in the second sub-region and that is located in the second sub-region is used as a second part of the second predicted lane line. Finally, the first part is integrated with the second part to obtain a finally output second predicted lane line.

Figure 23:
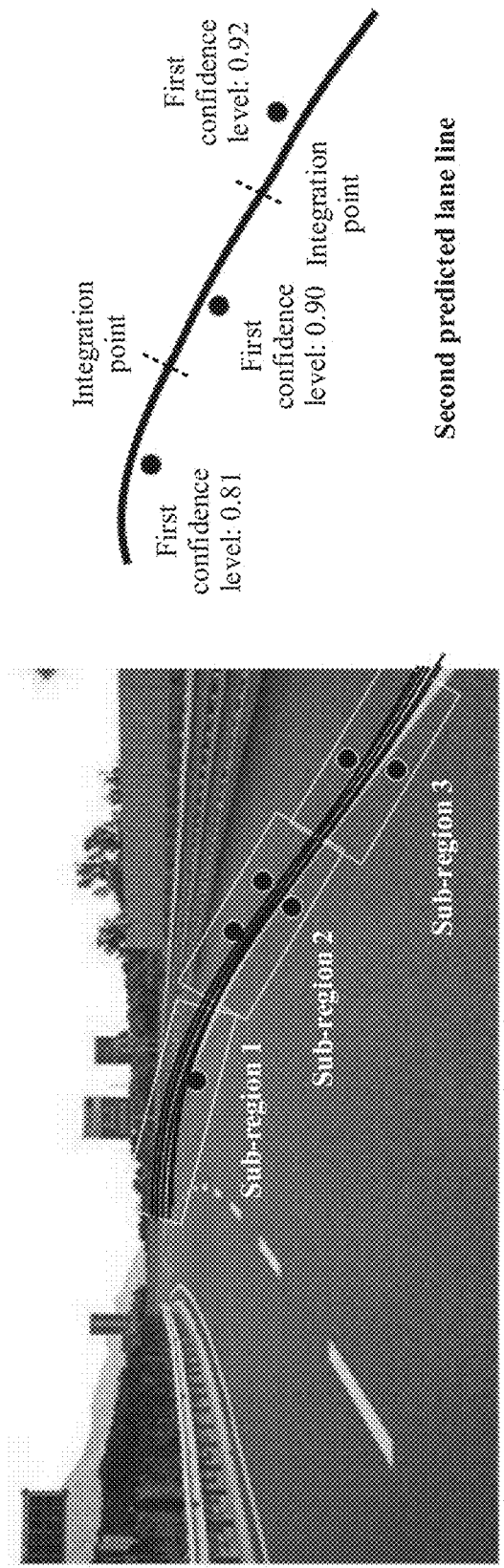
FIG. 23 is a schematic diagram of a method for obtaining a second predicted lane line by integrating a plurality of first predicted lane lines in a same group according to an embodiment of this disclosure.

For ease of understanding, FIG. 23 is used as an example below to illustrate a method for integrating a plurality of first predicted lane lines in a same group to obtain a second predicted lane line. Assuming that the first grid includes six first predicted lane lines, a region occupied by the six first predicted lane lines in the feature map is divided into a plurality of sub-regions (it is assumed that the region is divided into a sub-region 1, a sub-region 2, and a sub-region 3). Anchor point locations and quantities of first grids respectively included in the sub-region 1, the sub-region 2, and the sub-region 3 are shown in FIG. 23 (a black dot in FIG. 23 is the anchor point location of the first grid). It may be learned from FIG. 23 that the sub-region 1 includes an anchor point location of only one first grid. In this case, a part that is of a first predicted lane line corresponding to the first grid (whose first confidence level is 0.81) and that is located in the sub-region 1 is used as a part 1 constituting the second predicted lane line. The sub-region 2 includes anchor point locations of three grids, and first confidence levels corresponding to the three first grids are respectively 0.76, 0.83, and 0.90. In this case, a part that is of a first predicted lane line corresponding to the first grid whose confidence level is 0.90 and that is located in the sub-region 2 is selected as a second part 2 constituting the second predicted lane line. Similarly, the sub-region 3 includes anchor point locations of two first grids, and first confidence levels corresponding to the two first grids are respectively 0.75 and 0.92. In this case, a part that is of a first predicted lane line corresponding to the first grid whose confidence level is 0.92 and that is located in the sub-region 3 is selected as a part 3 constituting the second predicted lane line. Finally, the part 1, the part 2, and the part 3 are sequentially integrated to obtain a finally output second predicted lane line.

It should be noted that, in some implementations of this disclosure, FIG. 23 is still used as an example to illustrate another example of the method for integrating a plurality of first predicted lane lines in a same group to obtain a second predicted lane line. It is assumed that the first group includes six first predicted lane lines, and first confidence levels respectively corresponding to the six first predicted lane lines are 0.81, 0.76, 0.83, 0.90, and 0.92. In this case, a first predicted lane line corresponding to a maximum value 0.92 of the first confidence level is selected as a base line to replace, in all sub-regions, parts of first predicted lane lines in all the sub-regions in ascending order of the values of the first confidence levels, until the operation is completed in all the sub-regions. Finally, parts with a maximum value of the first confidence level are reserved in the sub-regions, and these parts constitute a finally output second predicted lane line. In this manner, in each group, a point that has good performance in a low-score predicted lane line is exchanged with a point that has poor performance in a high-score predicted lane line, so that a part that has poor prediction in the high-score predicted lane line is constantly corrected by using the point that has good performance in the low-score predicted lane line, to finally obtain a second predicted lane line closer to a real lane line.

Figure 24:
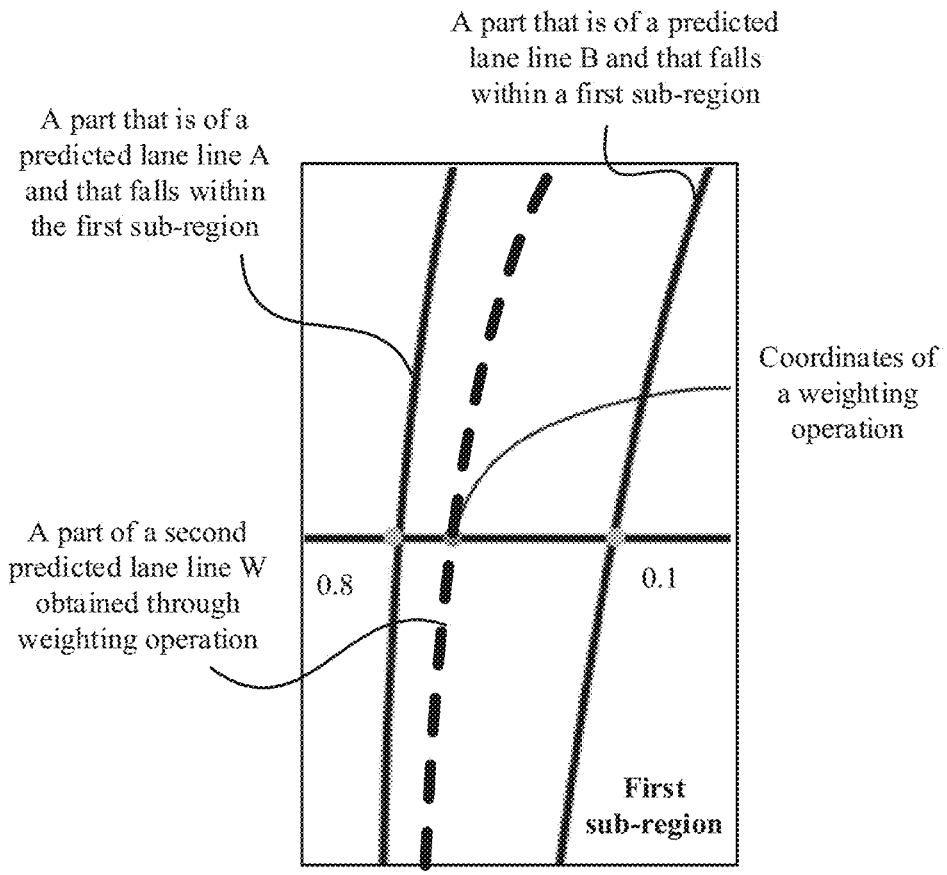
FIG. 24 is another schematic diagram of a method for obtaining a second predicted lane line by integrating a plurality of first predicted lane lines in a same group according to an embodiment of this disclosure.

In a processing manner 2, a weighting operation is performed on parts that are of first predicted lane lines respectively corresponding to the at least two first grids and that are located in the first sub-region, and an obtained operation result is used as a first part of the second predicted lane line. For ease of understanding, FIG. 24 is used as an example for description below. Assuming that the first sub-region shown in FIG. 24 includes anchor point locations (not shown in FIG. 24) of grids in which two first predicted lane lines A and B are respectively located, the predicted lane line A and the predicted lane line B each have a part falling within the first sub-region. Specifically, as shown in FIG. 24, each predicted lane line is formed by connecting coordinate points. Therefore, in an implementation of this disclosure, a weighting operation may be performed on coordinate points that are of the predicted lane lines A and B and that fall within the first sub-region, and then a part (that is, a dashed-line part) that is of a second predicted lane line W shown in FIG. 24 and that falls within the first sub-region is obtained based on an obtained weighted result (that is, a new series of coordinate points) for the coordinate points. Specifically, one coordinate point is used as an example to describe how to perform the weighting operation. It is assumed that a first confidence level of the predicted lane line A is 0.8, and a first confidence level of the predicted lane line B is 0.9. Based on different values of the first confidence levels, weights occupied in the weighting operation are also different. A specific weight ratio may be set according to a preset rule, which is not limited herein. Herein, it is assumed that a weight occupied by the predicted lane line A is 0.7, and a weight occupied by the predicted lane line B is 0.3. In addition, it is assumed that a value of a coordinate point in the predicted lane line A is 0.8, and a value of a coordinate point in the predicted lane line B is 0.1. Therefore, the following weighting operation is performed: 0.7*0.8+ 0.3*0.1=0.59, where 0.59 is one of coordinate points that constitute the second predicted lane line W.

It should be noted that the regions, the sub-regions, and the like shown in FIG. 23 and FIG. 24 are illustrated by using rectangular regions. In some implementations of this disclosure, shapes of the regions or the sub-regions are not limited. For example, the regions or the sub-regions may be circular regions, oval regions, trapezoidal regions, or even irregular regions, provided that a function of dividing the first predicted lane line can be implemented in the regions. This is not limited herein.

In the foregoing implementation of this disclosure, first, through a feature fusion process, the output second feature map fuses a plurality of layers of features of the first feature maps output by different layers of the neural network. The second feature map has a related feature of a low-layer receptive field, which facilitates accurate regression of a lane line, and further has a related feature of a high-layer receptive field, which helps determining whether a lane line exists. Then, an output predicted lane line set is divided into groups, and due to limitation of a receptive field, each predicted lane line in each group has an optimal prediction interval. In this embodiment of this disclosure, the optimal prediction interval of each line is selected to integrate lane lines. Finally, a finally output predicted lane line is formed by combining advantages of different predicted lane lines.

It should be noted that a detection device on which the foregoing trained lane line detection framework is deployed may be specifically various wheeled mobile devices, for example, may be a wheeled construction device, an autonomous driving vehicle, an assistant driving vehicle, and the like. Any wheeled movable device is referred to as the wheeled mobile device in this disclosure. The autonomous driving vehicle may be a car, a truck, a motorcycle, a bus, a boat, aircraft, a helicopter, a lawn mower, a recreational vehicle, an amusement park vehicle, a construction device, a tram, a golf cart, a train, a trolley, and the like. This is not specially limited in this embodiment of this disclosure.

To have a more intuitive understanding of beneficial effects brought by embodiments of this disclosure, technical effects brought by embodiments of this disclosure are further compared below. Refer to Table 1 and Table 2. Table 1 shows effects made on precision in a CULane dataset by different subitems of the lane line detection framework provided in embodiments of this disclosure. The CULane dataset marks 133235 pictures, which are divided into a training set including 88880 images, a verification set including 9675 images, and a test set including 34680 images. The dataset includes different situations such as night, day, dazzle light, and shadow, and collection places include different application scenarios such as a city, a countryside, and a high-speed road. The dataset is relatively representative, and therefore currently becomes a well-known dataset in the lane line detection field. In the CULane dataset, an algorithm related to the lane line detection framework provided in embodiments of this disclosure significantly improves a result, where "nms-C4" is an evaluation result of an original Line-NMS algorithm for a single-layer feature map, "ensemble-C4" is an evaluation result that is of the algorithm provided in embodiments of this disclosure and that is for the single-layer feature map, "ensemble-C3C4C5" is an evaluation result that is of the algorithm provided in embodiments of this disclosure and that is for a multi-layer feature map, and "ensemble-C3C4C5-masked" is an evaluation result that is of the algorithm provided in embodiments of this disclosure and that is for the multi-layer feature map. It may be learned from the table that each subitem in the present invention has approximately 0.1 contribution to F1.

TABLE 1

Effects made on precision in a CULane test set by different subitems of a current algorithm

| Methods | nms-C4 | ensemble-C4 | ensemble-C3C4C5 | ensemble-C3C4C5-masked |
|---|---|---|---|---|
| Normal | 88.6 | 90.0 | 90.4 | 90.7 |
| Crowded | 69.5 | 70.6 | 71.0 | 72.3 |
| Dazzle light | 65.0 | 66.6 | 67.8 | 67.7 |
| Shadow | 69.1 | 70.6 | 68.9 | 70.1 |
| No line | 47.1 | 47.6 | 47.8 | 49.4 |
| Arrow | 63.1 | 66.3 | 66.0 | 67.4 |
| Curve | 83.5 | 83.8 | 84.9 | 85.8 |
| Night | 65.6 | 68.0 | 68.2 | 69.7 |
| Crossroad | 2737.0 | 2737.0 | 1878.0 | 1746.0 |
| Total | 71.6 | 73.0 | 73.9 | 74.8 |

Table 2 shows a comparison between the algorithm in embodiments of this disclosure and a SOTA algorithm. "CurveLane-S", "CurveLane-M", and "CurveLane-L" are respectively search results of the algorithm in embodiments of this disclosure in a constraint of a small operation quantity, a constraint of a medium operation quantity, and a constraint of a large operation quantity. It may be learned from the following Table 2 that, performance of "CurveLane-S" is almost equal to that of SCNN in a case of 9G FLOPS, and "CurveLane-L" has a leading advantage in almost every subitem without consideration of an operation quantity.

TABLE 2

Comparison between a current algorithm and a SOTA algorithm in a CULane test set

| | Methods | | | | | | |
|---|---|---|---|---|---|---|---|
| | SCNN | SAD | SAD | PointLane | CurveLane-S | CurveLane-M | CurveLane-L |
| | | | | Backbone | | | |
| | SCNN | ENet | R101 | R101 | Searched | Searched | Searched |
| Normal | 90.6 | 90.1 | 90.7 | 88 | 88.3 | 90.2 | 90.7 |
| Crowded | 69.7 | 68.8 | 70 | 68.1 | 68.6 | 70.5 | 72.3 |

TABLE 2-continued

Comparison between a current algorithm and a SOTA algorithm in a CULane test set

| | Methods | | | | | | |
|---|---|---|---|---|---|---|---|
| | SCNN | SAD | SAD | PointLane | CurveLane-S | CurveLane-M | CurveLane-L |
| | | | | Backbone | | | |
| | SCNN | ENet | R101 | R101 | Searched | Searched | Searched |
| Dazzle light | 58.5 | 60.2 | 59.9 | 61.5 | 63.2 | 65.9 | 67.7 |
| Shadow | 66.9 | 65.9 | 67 | 63.3 | 68 | 69.3 | 70.1 |
| No line | 43.4 | 41.6 | 43.5 | 44 | 47.9 | 48.8 | 49.4 |
| Arrow | 84.1 | 84 | 84.4 | 80.9 | 82.5 | 85.7 | 85.8 |
| Curve | 64.4 | 65.7 | 65.7 | 65.2 | 66 | 67.5 | 68.4 |
| Night | 66.1 | 66 | 66.3 | 63.2 | 66.2 | 68.2 | 68.9 |
| Crossroad | 1990 | 1998 | 2052 | 1640 | 2817 | 2359 | 1746 |
| FLOPS(G) | 328.4 | 3.9 | 162.2 | 25.1 | 9 | 35.7 | 86.5 |
| Total | 71.6 | 70.8 | 71.8 | 70.2 | 71.4 | 73.5 | 74.8 |

Because the trained lane line detection framework in embodiments of this disclosure may be used in fields such as a smart city and intelligent driving to detect a lane line, a plurality of application scenarios of a plurality of landing products are described below.

(1) Autonomous Driving

In autonomous driving, lane line detection is extremely important for accurate positioning of an autonomous driving vehicle and has extremely important impact on a driving decision. As one piece of main indication information on a road surface, a lane line can effectively guide an intelligent vehicle to travel in a restricted road region. Real-time detection of a lane line on a road surface is an important step in an assistant driving system of the intelligent vehicle. The technology facilitates functions such as path planning assistance and road deviation warning, and can provide a reference for precise navigation. The trained lane line detection framework in embodiments of this disclosure may be deployed on the autonomous driving vehicle shown in FIG. 10, and is configured to detect, in real time, a lane line in a to-be-detected image that is related to a road surface and that is collected by a mounted camera.

(2) Augmented Reality (AR) Navigation

As a quantity of vehicles increases over time, an activity range of people also correspondingly expands. Therefore, people randomly drive to a destination depending on only experience, and travel of people increasingly relies on navigation. In conventional navigation, a vehicle location is projected onto a map based on a GPS signal, and navigation software plans a traveling path based on a specified destination, and directs a user to travel to the destination through screen display and voice broadcast. In this display manner, during driving, a driver needs to connect map guide information and voice broadcast information to a real world in which a self-owned vehicle is currently located, to understand a specific meaning of the guide information. If during driving, the driver encounters a forked road but fails to listen to navigation broadcast clearly, it is prone to miss an opportunity for changing a lane.

Figure 25:
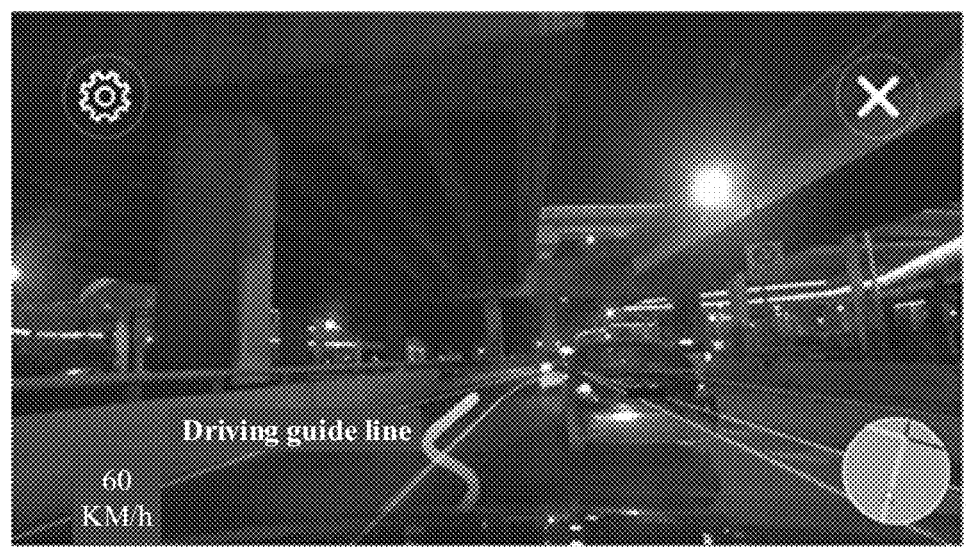
FIG. 25 is a schematic diagram of an application scenario according to an embodiment of this disclosure.

In AR navigation (as shown in FIG. 25), navigation information and a lane line detection result are integrated, so that a system can calculate a precision location of a vehicle and an optimal lane-changing opportunity based on the location of the vehicle and the lane line detection result. This optimizes a display mode of guidance information and reduces receiving and understanding costs of a user. What you see is what you get, so that the user only needs to act based on the navigation information. Combination of accurate lane line detection information and proper navigation information can effectively guide a vehicle to travel in a restricted road region, thereby improving use experience of in-vehicle navigation software in a current phase.

It should be understood that autonomous driving and AR navigation described above are merely two specific scenarios to which the lane line detection framework and the lane line detection method constructed in embodiments of this disclosure are applied. The trained lane line detection framework in embodiments of this disclosure is not limited to being used in foregoing scenario, and can be applied to any scenario in which lane line identification and lane line detection need to be performed.

Figure 26:
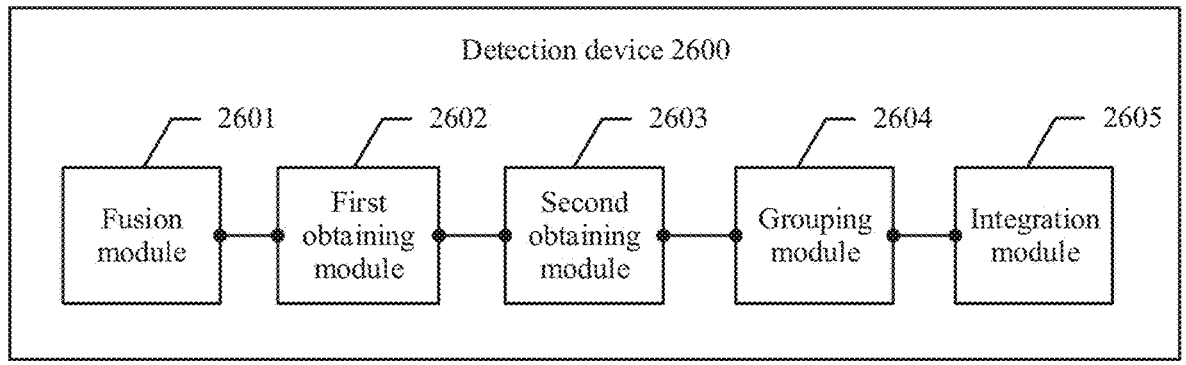
FIG. 26 is a schematic diagram of a detection device according to an embodiment of this disclosure.

Based on the foregoing embodiments, to better implement the foregoing solutions in embodiments of this disclosure, related devices configured to implement the foregoing solutions are further provided below. Specifically, FIG. 26 is a schematic diagram of a detection device 2600 according to an embodiment of this disclosure. The detection device 2600 may specifically include a fusion module 2601, a first obtaining module 2602, a second obtaining module 2603, a grouping module 2604, and an integration module 2605. The fusion module 2601 is configured to perform feature fusion on first feature maps output by different layers of a trained neural network to obtain a second feature map, where input of the trained neural network is a to-be-detected image. The first obtaining module 2602 is configured to divide the second feature map into a plurality of grids, and obtain a first confidence level of a first grid in the plurality of grids, where the first confidence level is used to indicate a first probability that a real lane line in the second feature map passes through the first grid, and the first probability exceeds a first preset threshold. The second obtaining module 2603 is configured to obtain, by using a trained prediction head model, a first predicted lane line corresponding to the first grid. The grouping module 2604 is configured to: when there are n first grids, divide n first predicted lane lines into m groups, where $m \leq n$ and $n \geq 2$. The integration module 2605 is configured to: when a first group in the m groups includes q first predicted lane lines, integrate the q first predicted lane lines based on q first confidence levels respectively corresponding to the q first predicted lane lines and q first grids respectively corresponding to the q first predicted lane lines, to obtain a second predicted lane line, where the second predicted lane line is output as a detection result for a real lane line in the second feature map, and $q \geq 2$.

In the foregoing implementation of this disclosure, first, features extracted by different layers of the neural network are fused to obtain the fused second feature map, so that the second feature map obtained through fusion processing has a plurality of layers of features. The second feature map has a related feature of a low-layer receptive field, which facilitates accurate regression of a lane line, and further has a related feature of a high-layer receptive field, which helps determining whether a lane line exists. Then, an output predicted lane line set is divided into groups, and due to limitation of a receptive field, each predicted lane line in each group has an optimal prediction interval. In this embodiment of this disclosure, the optimal prediction interval of each predicted lane line is selected to integrate lane lines. Finally, a finally output predicted lane line is formed by combining advantages of different predicted lane lines, thereby improving lane line detection precision.

In a possible design, the integration module 2605 is specifically configured to: first, divide a region occupied by the q first predicted lane lines in the second feature map into a plurality of sub-regions, where each sub-region includes a central point location of at least one of the q first grids; when a first sub-region in the plurality of sub-regions includes central point locations of at least two first grids, select a first grid from the at least two first grids as a second grid based on first confidence levels respectively corresponding to the at least two first grids, and use, as a first part of the second predicted lane line, a part that is of a first predicted lane line corresponding to the second grid and that is located in the first sub-region; or perform a weighting operation on parts that are of first predicted lane lines corresponding to the at least two first grids and that are located in the first sub-region, and use an obtained operation result as the first part of the second predicted lane line; when a second sub-region in the plurality of sub-regions includes a central point location of only one first grid, use, as a second part of the second predicted lane line, a part that is of a first predicted lane line corresponding to the first grid included in the second sub-region and that is located in the second sub-region; and integrate the first part with the second part to obtain the second predicted lane line.

In the foregoing implementation of this disclosure, how to integrate a plurality of first predicted lane lines in a group is specifically described. To be specific, advantages of the plurality of first predicted lane lines are selected for integration, to form a finally output detection result, that is, a second predicted lane line. The finally output second predicted lane line fuses the advantages of the plurality of first predicted lane lines, so that detection precision is improved.

In a possible design, the integration module 2605 is further specifically configured to: select, from the at least two first grids based on the first confidence levels respectively corresponding to the at least two first grids, a first grid whose first confidence level has a maximum value as the second grid.

In the foregoing implementation of this disclosure, a manner of determining the second grid is described, to be specific, the first grid whose first confidence level has a maximum value is selected. This is flexible and convenient and is more applicable to an actual use scenario.

In a possible design, the integration module 2605 is further specifically configured to: when the first group in the m groups includes only one first predicted lane line, output the first predicted lane line in the first group as a detection result for a real lane line in the second feature map.

In the foregoing implementation of this disclosure, it is indicated that when there is only one first predicted lane line in a group, integration is not required, and the first predicted lane line is directly output as a prediction result. Different quantities of first predicted lane lines in a group respectively correspond to different processing manners. This has flexibility and also meets actual application.

In a possible design, the fusion module 2601 is specifically configured to: first, construct search space, where the search space is formed by combining code of a plurality of neural networks and code of a plurality of feature fusion models, and the plurality of feature fusion models are constructed according to a plurality of preset rules; then, perform sampling in the search space to obtain a first sampling point, where the first sampling point is a first code combination formed by code of a first neural network and code of a first feature fusion model; further, generate a first lane line detection network based on the first code combination, and train the first lane line detection network by using a training set; perform performance evaluation based on the trained first lane line detection network; when a quantity of sampling times reaches a preset value and performance of the trained first lane line detection network meets a preset condition, extract a feature from a to-be-detected image by using the first neural network in the trained first lane line detection network, to obtain first feature maps output by different layers of the first neural network; and finally, use the first feature maps output by different layers of the first neural network as input of the first feature fusion model in the trained first lane line detection network, to output the second feature map.

In the foregoing implementation of this disclosure, the search space for the neural network and the feature fusion model is constructed, and a target neural network and a target feature fusion model that meet a requirement are obtained through searching. In this searching manner, related structures of a target neural network and a target feature fusion model that best match a detection task can be selected from a large quantity of neural networks and feature fusion models, thereby indirectly improving detection performance of a model.

In a possible design, the plurality of preset rules include at least one of the following: First, at least two high-resolution first feature maps are separately operated by using at least one first convolution kernel to obtain at least two third feature maps. Then, resolution of the at least two third feature maps is processed to obtain at least two fourth feature maps having same resolution as a low-resolution first feature map. Finally, the at least two fourth feature maps are fused with the low-resolution first feature map in a preset combination manner to obtain at least one second feature map.

In the foregoing implementation of this disclosure, because the feature fusion model is constructed according to the preset fusion rule (that is, a preset rule) in this embodiment of this disclosure, and different feature fusion models are constructed according to different fusion rules. Therefore, one of the fusion rules is described to help understand the fusion rule described in this disclosure.

In a possible design, the resolution of the at least two third feature maps is processed in at least one of the following manners: performing a downsampling operation, a pooling operation, or a convolution operation on the at least two third feature maps.

In the foregoing implementation of this disclosure, several processing manners of reducing resolution are specifically described, which are optional.

In a possible design, that performance of the trained first lane line detection network meets a preset condition includes: Performance of the trained first lane line detection network is optimal in performance of lane line detection networks corresponding to all sampling points.

In the foregoing implementation of this disclosure, it is indicated that a manner of meeting the preset condition is that performance is optimal. This meets a requirement in an actual application scenario, and indirectly improves overall performance of a device.

In a possible design, the first obtaining module 2602 is specifically configured to: first, divide the second feature map into a plurality of grids, and obtain an initial confidence level of a first grid in the plurality of grids, where the initial confidence level is used to indicate an initial probability that a real lane line in the second feature map passes through the first grid, and the initial probability exceeds an initial preset threshold; and finally, adjust the initial confidence level in a preset manner to obtain a first confidence level of the first grid.

In the foregoing implementation of this disclosure, it is indicated that the first confidence level of the first grid is obtained by adjusting the initial confidence level of the first grid. This is because the initial confidence level is a roughly estimated value, and precision is not high enough when the initial confidence level is used in a lane line prediction process. A purpose of the adjustment is to make prediction for a remote end of a lane line more accurate in the prediction process.

In a possible design, the first obtaining module 2602 is further specifically configured to: first, establish a statistical model based on distribution of central point locations of grids in which remote ends of real lane lines in images in a training set are located, where the statistical model has at least one to-be-determined parameter; then, estimate the parameter based on a statistical result for the central point locations of the grids in which the remote ends of the real lane lines in the images in the training set are located, to obtain an estimated value of the parameter; afterwards, adjust the estimated value of the parameter in a training process to obtain a determinate value of the parameter, and calculate a central point location of the first grid by using the statistical model for which the determinate value of the parameter is determined, to obtain a weight value of the central point location of the first grid; and finally, perform an operation on the initial confidence level of the first grid and the weight value to obtain the first confidence level of the first grid.

In the foregoing implementation of this disclosure, a manner of obtaining the first confidence level based on a statistical method by using the initial confidence level is provided, which is operable.

In a possible design, the statistical model includes a Gaussian function.

In the foregoing implementation of this disclosure, the statistical model may be modeled as the Gaussian function because a horizontal central cross-section of a frequency heatmap for central point locations of grids in which remote ends of lane lines are located approximates to the Gaussian function.

Figure 27:
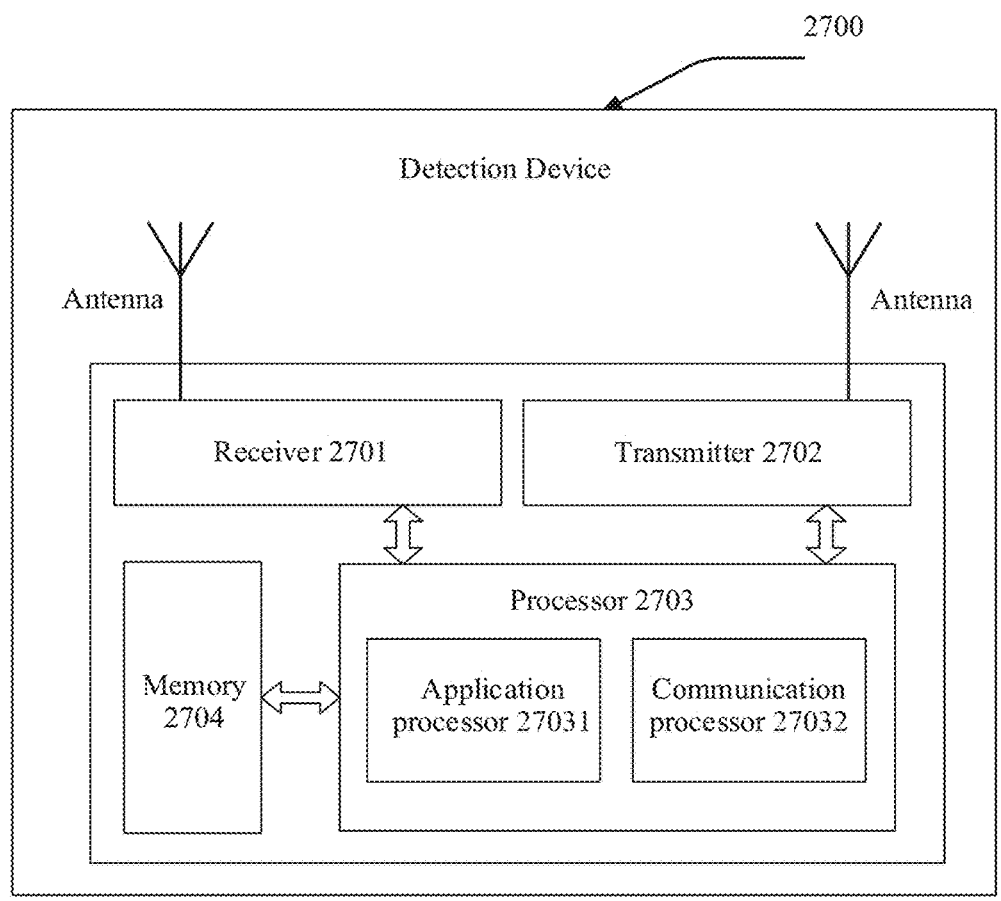
FIG. 27 is another schematic diagram of a detection device according to an embodiment of this disclosure.

Next, a detection device provided in an embodiment of this disclosure is described. FIG. 27 is a schematic diagram of a structure of a detection device according to an embodiment of this disclosure. A detection device 2700 may specifically be various terminal devices, for example, a related system (for example, an environment perception system shown in FIG. 10) on a wheeled mobile device. This is not limited herein. The lane line detection framework described in the embodiment corresponding to FIG. 8 may be deployed on the detection device 2700, to implement a function of the lane line detection method in the embodiment corresponding to FIG. 11. Specifically, the detection device 2700 includes a receiver 2701, a transmitter 2702, a processor 2703, and a memory 2704 (there may be one or more processors 2703 in the detection device 2700, and one processor is used as an example in FIG. 27). The processor 2703 may include an application processor 27031 and a communication processor 27032. In some embodiments of this disclosure, the receiver 2701, the transmitter 2702, the processor 2703, and the memory 2704 may be connected by using a bus or in another manner.

The memory 2704 may include a read-only memory and a random access memory, and provide an instruction and data to the processor 2703. A part of the memory 2704 may further include a non-volatile random access memory (non-volatile random access memory, NVRAM). The memory 2704 stores the processor and operation instructions, an executable module or a data structure, a subset thereof, or an extension set thereof. The operation instructions may include various operation instructions for implementing various operations.

The processor 2703 controls an operation of the detection device 2700. In a specific application, components of the detection device 2700 are coupled together by using a bus system. In addition to a data bus, the bus system may further include a power bus, a control bus, and a status signal bus. However, for clear description, various types of buses in the figure are marked as the bus system.

The method disclosed in the embodiment corresponding to FIG. 11 in this disclosure may be applied to the processor 2703 or implemented by the processor 2703. The processor 2703 may be an integrated circuit chip and has a signal processing capability. In an implementation process, steps in the foregoing methods can be implemented by using a hardware integrated logical circuit in the processor 2703, or by using instructions in a form of software. The processor 2703 may be a general-purpose processor, a digital signal processor (DSP), a microprocessor, or a microcontroller, and may further include an application-specific integrated circuit (ASIC), a field-programmable gate array (FPGA) or another programmable logic device, a discrete gate or transistor logic device, or a discrete hardware component. The processor 2703 may implement or perform the methods, steps, and logical block diagrams disclosed in the embodiment corresponding to FIG. 12 in this disclosure. The general-purpose processor may be a microprocessor, or the processor may be any conventional processor, or the like. Steps of the methods disclosed with reference to embodiments of this disclosure may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 2704, and the processor 2703 reads information in the memory 2704 and completes the steps in the foregoing methods in combination with hardware of the processor 2703.

The receiver 2701 may be configured to receive input digit or character information and generate signal input related to related setting and function control of the detection device 2700. The transmitter 2702 may be configured to output digit or character information by using a first interface. The transmitter 2702 may be further configured to send an instruction to a disk group by using the first interface, to modify data in the disk group. The transmitter 2702 may further include a display device such as a display screen.

An embodiment of this disclosure further provides a computer-readable storage medium. The computer-readable storage medium stores a program used to process a signal. When the program runs on a computer, the computer is enabled to perform steps performed by the execution device in the description of the foregoing embodiment.

The detection device provided in embodiments of this disclosure may be specifically a chip, and the chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the detection device performs the lane line detection method described in the foregoing embodiments. Optionally, the storage unit is a storage unit in the chip, such as a register or a cache, and the storage unit may alternatively be a storage unit inside the detection device end and outside the chip, such as a read-only memory (ROM) or another type of static storage device that can store static information and instructions, or a random access memory (RAM).

Figure 28:
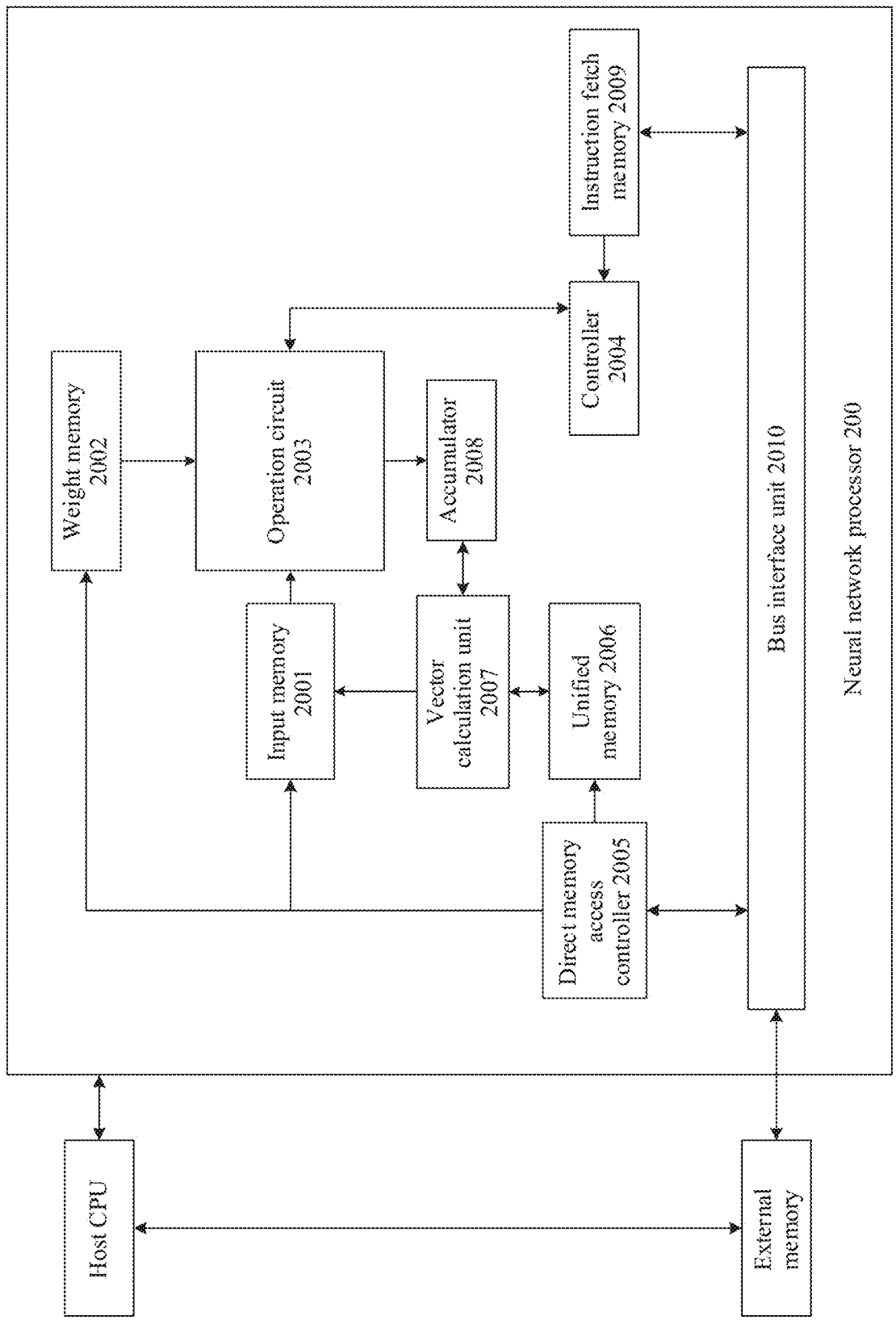
FIG. 28 is a schematic diagram of a structure of a chip according to an embodiment of this disclosure.

Specifically, FIG. 28 is a schematic diagram of a structure of a chip according to an embodiment of this disclosure. The chip may be a neural network processor NPU 200. The NPU 200 is mounted to a host CPU as a coprocessor, and the host CPU allocates a task to the NPU 200. A core part of the NPU is an operation circuit 2003, and the operation circuit 2003 is controlled by a controller 2004 to extract matrix data from a memory and perform a multiplication operation.

In some implementation, the operation circuit 2003 includes a plurality of processing units (PE). In some implementation, the operation circuit 2003 is a two-dimensional systolic array. The operation circuit 2003 may alternatively be a one-dimensional systolic array or another electronic line that can perform a mathematical operation such as multiplication and addition. In some implementation, the operation circuit 2003 is a general-purpose matrix processor.

For example, it is assumed that there is an input matrix A, a weight matrix B, and an output matrix C. The operation circuit 2003 fetches, from a weight memory 2002, data corresponding to the matrix B, and buffers the data on each PE in the operation circuit 2003. The operation circuit 2003 fetches, from an input memory 2001, data of the matrix A to perform a matrix operation with the data of the matrix B, to obtain a partial result or a final result of the matrix, and stores the result in an accumulator 2008.

A unified memory 2006 is configured to store input data and output data. Weight data is directly transferred to the weight memory 2002 by using a direct memory access controller (DMAC) 2005. Input data is also transferred to the unified memory 2006 by using the DMAC.

A bus interface unit (BIU) 2010 is used for interaction between an AXI bus and each of the DMAC and an instruction buffer memory (IFB) 2009.

The bus interface unit 2010 is further used by the instruction fetch buffer 2009 to obtain an instruction from an external memory, and is further used by the storage unit access controller 2005 to obtain original data of the input matrix A or the weight matrix B from the external memory.

The DMAC is mainly configured to transfer input data in an external memory DDR to the unified memory 2006, transfer weight data to the weight memory 2002, or transfer input data to the input memory 2001.

A vector calculation unit 2007 includes a plurality of operation processing units, and if required, performs further processing on output of the operation circuit 2003, such as vector multiplication, vector addition, an exponential operation, a logarithmic operation, and value comparison. The vector calculation unit 2007 is mainly used for network calculation in a non-convolutional layer/fully connected layer of a neural network, such as batch normalization (batch normalization), pixel-level summation, and upsampling on a feature plane.

In some implementation, the vector calculation unit 2007 can store an output processed vector in the unified memory 2006. For example, the vector calculation unit 2007 may apply a linear function and/or a non-linear function to output of the operation circuit 2003, for example, perform linear interpolation on a feature plane extracted in a convolution layer. For another example, the vector calculation unit 2007 accumulates vector values to generate an active value. In some implementation, the vector calculation unit 2007 generates a normalized value, a pixel-level summation value, or both. In some implementation, the output processed vector can be used as active input of the operation circuit 2003, for example, used in a subsequent layer of the neural network.

The IFB 2009 connected to the controller 2004 is configured to store an instruction used by the controller 2004.

The unified memory 2006, the input memory 2001, the weight memory 2002, and the instruction fetch buffer 2009 are all on-chip memories. The external memory is private to the NPU hardware architecture.

The processor mentioned at any above location may be a general-purpose central processing unit, a microprocessor, an ASIC, or one or more integrated circuits configured to control program execution of the method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this disclosure, connection relationships between modules indicate that the modules have communication connections with each other, which may be specifically implemented as one or more communication buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this disclosure, software program implementation is a better implementation in most cases. Based on such an understanding, the technical solutions in this disclosure essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, a network device, or the like) to perform the methods described in embodiments of this disclosure.

All or some of the foregoing embodiments may be implemented by software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, training device, or data center to another web site, computer, training device, or data center in a wired manner (for example, a coaxial cable, an optical fiber, a digital subscriber line (DSL)) or wireless manner (for example, infrared, wireless, microwave). The computer-readable storage medium may be any usable medium accessible by a computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

What is claimed is:

1. A lane line detection method, comprising:
   performing feature fusion on first feature maps that are output by different layers of a trained neural network, to obtain a second feature map, wherein input of the trained neural network is a to-be-detected image;
   dividing the second feature map into a plurality of grids;
   obtaining a first confidence level of each of n first grids in the plurality of grids, wherein the first confidence level indicates a first probability that a real lane line in the second feature map passes through the corresponding first grid, and the first probability exceeds a first preset threshold;
   obtaining, by using a trained prediction head model, a first predicted lane line corresponding to each of the n first grids;
   dividing n first predicted lane lines into m groups, wherein m≤n and n≥2, and wherein a first group in the m groups comprises q first predicted lane lines; and
   integrating the q first predicted lane lines based on q first confidence levels corresponding to the q first predicted lane lines and q first grids corresponding to the q first predicted lane lines, to obtain a second predicted lane line, wherein the second predicted lane line is output as a detection result for a real lane line in the second feature map, and q≥2.

2. The method of claim 1, wherein integrating the q first predicted lane lines comprises:
   dividing a region occupied by the q first predicted lane lines in the second feature map into a plurality of sub-regions, wherein each sub-region comprises a central point location of at least one of q first grids, wherein a first sub-region in the plurality of sub-regions comprises central point locations of at least two first grids, and wherein a second sub-region in the plurality of sub-regions comprises a central point location of one first grid;
   selecting a first grid from the at least two first grids as a second grid based on first confidence levels corresponding to the at least two first grids, and using, as a first part of the second predicted lane line, a part that is of a first predicted lane line corresponding to the second grid and that is located in the first sub-region; or performing a weighting operation on parts that are of first predicted lane lines corresponding to the at least two first grids and that are located in the first sub-region, and using an obtained operation result as the first part;
   using, as a second part of the second predicted lane line, a part that is of a first predicted lane line corresponding to the first grid comprised in the second sub-region and that is located in the second sub-region; and
   integrating the first part with the second part to obtain the second predicted lane line.

3. The method of claim 2, wherein selecting the first grid from the at least two first grids as the second grid comprises:
   selecting, from the at least two first grids based on the first confidence levels corresponding to the at least two first grids, a first grid that has a first confidence level of a maximum value as the second grid.

4. The method of claim 1, wherein the first group in the m groups comprises one first predicted lane line, and wherein the method further comprises:
   outputting the first predicted lane line in the first group as a detection result for a real lane line in the second feature map.

5. The method of claim 1, wherein performing feature fusion on first feature maps to obtain the second feature map comprises:
   constructing search space that is formed by combining code of a plurality of neural networks and code of a plurality of feature fusion models, and the plurality of feature fusion models are constructed of a plurality of preset rules;
   performing sampling in the search space to obtain a first sampling point, wherein the first sampling point is a first code combination formed by code of a first neural network and code of a first feature fusion model;
   generating a first lane line detection network based on the first code combination, and training the first lane line detection network by using a training set;
   performing performance evaluation based on the trained first lane line detection network to obtain performance of the trained first lane line detection network;
   in response to determining that a quantity of sampling times reaches a preset value and performance of the trained first lane line detection network satisfies a preset condition, extracting a feature from a to-be-detected image by using the first neural network in the trained first lane line detection network, to obtain first feature maps output by different layers of the first neural network; and
   using the first feature maps as input of the first feature fusion model in the trained first lane line detection network, to output the second feature map.

6. The method of claim 5, wherein the plurality of preset rules comprise at least one of the following:
   separately operating at least two high-resolution first feature maps by using at least one first convolution kernel to obtain at least two third feature maps;

processing resolution of the at least two third feature maps to obtain at least two fourth feature maps having same resolution as a low-resolution first feature map; and fusing the at least two fourth feature maps with the low-resolution first feature map in a preset combination manner to obtain at least one second feature map.

7. The method of claim 6, wherein the processing resolution of the at least two third feature maps comprises at least one of the following manners:

performing a downsampling operation, a pooling operation, or a convolution operation on the at least two third feature maps.

8. The method of claim 5, wherein the performance of the trained first lane line detection network satisfies the preset condition if the performance of the trained first lane line detection network is optimal in performance of lane line detection networks corresponding to all sampling points.

9. The method of claim 1, wherein dividing the second feature map into a plurality of grids and obtaining a first confidence level of a first grid in the plurality of grids comprises:

dividing the second feature map into a plurality of grids and obtaining an initial confidence level of the first grid in the plurality of grids, wherein the initial confidence level indicates an initial probability that a real lane line in the second feature map passes through the first grid, and the initial probability exceeds an initial preset threshold; and adjusting the initial confidence level in a preset manner to obtain a first confidence level of the first grid.

10. The method of claim 9, wherein adjusting the initial confidence level in the preset manner to obtain the first confidence level of the first grid comprises:

establishing a statistical model based on distribution of central point locations of grids in which remote ends of real lane lines in images in a training set are located, wherein the statistical model has at least one parameter;

estimating the at least one parameter based on a statistical result for the central point locations of the grids in which the remote ends of the real lane lines in the images in the training set are located, to obtain an estimated value of the at least one parameter;

adjusting the estimated value of the at least one parameter in a training process to obtain a determinate value of the at least one parameter;

calculating a central point location of the first grid by using the statistical model for which the determinate value of the at least one parameter is determined, to obtain a weight value of the central point location of the first grid; and performing an operation on the initial confidence level of the first grid and the weight value to obtain the first confidence level of the first grid.

11. A lane line detection framework, comprising a neural network, a feature fusion model, a confidence level adjustment model, a prediction head model, and a predicted lane line integration model;

the neural network is configured to extract a feature from an input to-be-detected image after being trained;

the feature fusion model is configured to perform feature fusion on first feature maps that are output by different layers of the trained neural network, to obtain a second feature map;

the confidence level adjustment model is configured to divide the second feature map into a plurality of grids and obtain a first confidence level of each of n first grids in the plurality of grids, wherein the first confidence level indicates a first probability that a real lane line in the second feature map passes through the corresponding first grid, and the first probability exceeds a first preset threshold;

the prediction head model is configured to obtain, after being trained, a first predicted lane line corresponding to each of the n first grid;

the predicted lane line integration model is configured to divide n first predicted lane lines into m groups, wherein m≤n and n≥2, and wherein a first group in the m groups comprises q first predicted lane lines; and the predicted lane line integration model is configured to integrate the q first predicted lane lines based on q first confidence levels corresponding to the q first predicted lane lines and q first grids corresponding to the q first predicted lane lines, to obtain a second predicted lane line, wherein the second predicted lane line is output as a detection result for a real lane line in the second feature map, and q≥2.

12. A detection device, comprising:

at least one processor; and a memory coupled to the at least one processor and storing programming instructions for execution by the detection device to perform operations comprising:

performing feature fusion on first feature maps that are output by different layers of a trained neural network, to obtain a second feature map, wherein input of the trained neural network is a to-be-detected image;

dividing the second feature map into a plurality of grids;

obtaining a first confidence level of each of n first grids in the plurality of grids, wherein the first confidence level indicates a first probability that a real lane line in the second feature map passes through the corresponding first grid, and the first probability exceeds a first preset threshold;

obtaining, by using a trained prediction head model, a first predicted lane line corresponding to each of the n first grid;

dividing n first predicted lane lines into m groups, wherein m≤n and n≥2, and wherein a first group in the m groups comprises q first predicted lane lines; and integrating the q first predicted lane lines based on q first confidence levels corresponding to the q first predicted lane lines and q first grids corresponding to the q first predicted lane lines, to obtain a second predicted lane line, wherein the second predicted lane line is output as a detection result for a real lane line in the second feature map, and q≥2.

13. The detection device of claim 12, wherein integrating the q first predicted lane lines comprises:

dividing a region occupied by the q first predicted lane lines in the second feature map into a plurality of sub-regions, wherein each sub-region comprises a central point location of at least one of q first grids, wherein a first sub-region in the plurality of sub-regions comprises central point locations of at least two first grids, and wherein a second sub-region in the plurality of sub-regions comprises a central point location of one first grid;

selecting a first grid from the at least two first grids as a second grid based on first confidence levels corresponding to the at least two first grids, and using, as a first part of the second predicted lane line, a part that is of a first predicted lane line corresponding to the second grid and that is located in the first sub-region; or performing a weighting operation on parts that are of first predicted lane lines corresponding to the at least two first grids and that are located in the first sub-region, and using an obtained operation result as the first part;

using, as a second part of the second predicted lane line, a part that is of a first predicted lane line corresponding to the first grid comprised in the second sub-region and that is located in the second sub-region; and integrating the first part with the second part to obtain the second predicted lane line.

14. The detection device of claim 13, wherein selecting the first grid from the at least two first grids as the second grid comprises:

selecting, from the at least two first grids based on the first confidence levels corresponding to the at least two first grids, a first grid that has a first confidence level of a maximum value as the second grid.

15. The detection device of claim 12, wherein the first group in the m groups comprises one first predicted lane line, and wherein the operations further comprising:

outputting the first predicted lane line in the first group as a detection result for a real lane line in the second feature map.

16. The detection device of claim 12, wherein performing feature fusion on first feature maps to obtain the second feature map comprises:

constructing search space that is formed by combining code of a plurality of neural networks and code of a plurality of feature fusion models, and the plurality of feature fusion models are constructed of a plurality of preset rules;

performing sampling in the search space to obtain a first sampling point, wherein the first sampling point is a first code combination formed by code of a first neural network and code of a first feature fusion model;

generating a first lane line detection network based on the first code combination, and training the first lane line detection network by using a training set;

performing performance evaluation based on the trained first lane line detection network to obtain performance of the trained first lane line detection network;

in response to determining that a quantity of sampling times reaches a preset value and performance of the trained first lane line detection network satisfies a preset condition, extracting a feature from a to-be-detected image by using the first neural network in the trained first lane line detection network, to obtain first feature maps output by different layers of the first neural network; and using the first feature maps as input of the first feature fusion model in the trained first lane line detection network, to output the second feature map.

17. The detection device of claim 16, wherein the plurality of preset rules comprise at least one of the following:

separately operating at least two high-resolution first feature maps by using at least one first convolution kernel to obtain at least two third feature maps;

processing resolution of the at least two third feature maps to obtain at least two fourth feature maps having same resolution as a low-resolution first feature map; and fusing the at least two fourth feature maps with the low-resolution first feature map in a preset combination manner to obtain at least one second feature map.

18. The detection device of claim 17, wherein processing resolution of the at least two third feature maps comprises at least one of the following manners:

performing a downsampling operation, a pooling operation, or a convolution operation on the at least two third feature maps.

19. The detection device of claim 16, wherein the performance of the trained first lane line detection network satisfies the preset condition if the performance of the trained first lane line detection network is optimal in performance of lane line detection networks corresponding to all sampling points.

20. The detection device of claim 12, wherein dividing the second feature map into a plurality of grids and obtaining a first confidence level of a first grid in the plurality of grids comprises:

dividing the second feature map into a plurality of grids and obtaining an initial confidence level of the first grid in the plurality of grids, wherein the initial confidence level indicates an initial probability that a real lane line in the second feature map passes through the first grid, and the initial probability exceeds an initial preset threshold; and adjusting the initial confidence level in a preset manner to obtain a first confidence level of the first grid.

* * * * *